(12) United States Patent
Cormier et al.

(10) Patent No.: US 12,325,186 B2
(45) Date of Patent: Jun. 10, 2025

(54) EXTRUSION SYSTEM FOR ADDITIVE MANUFACTURING

(71) Applicant: PRISAM LLC, Rochester, NY (US)

(72) Inventors: Denis Cormier, Pittsford, NY (US);
Pritam Poddar, Rochester, NY (US);
Xavier Tarr, Rochester, NY (US);
Justin Kon, Rochester, NY (US);
Adam Foster, Rochester, NY (US)

(73) Assignee: PRISAM LLC, Rochester, NY (US)

( * ) Notice: Subject to any disclaimer, the term of this patent is extended or adjusted under 35 U.S.C. 154(b) by 0 days.

(21) Appl. No.: 17/929,721

(22) Filed: Sep. 5, 2022

(65) Prior Publication Data

US 2023/0173751 A1    Jun. 8, 2023

Related U.S. Application Data

(60) Provisional application No. 63/263,513, filed on Nov. 3, 2021.

(51) Int. Cl.

| | |
|---|---|
| *B29C 64/118* | (2017.01) |
| *B29C 64/209* | (2017.01) |
| *B29C 64/227* | (2017.01) |
| *B29C 64/30* | (2017.01) |
| *B33Y 10/00* | (2015.01) |
| *B33Y 30/00* | (2015.01) |
| *B33Y 40/20* | (2020.01) |

(52) U.S. Cl.
CPC .......... *B29C 64/209* (2017.08); *B29C 64/118* (2017.08); *B29C 64/227* (2017.08); *B29C 64/30* (2017.08); *B33Y 10/00* (2014.12); *B33Y 30/00* (2014.12); *B33Y 40/20* (2020.01)

(58) Field of Classification Search
CPC ... B29C 64/209; B29C 64/118; B29C 64/227; B29C 64/30; B33Y 10/00; B33Y 30/00; B33Y 40/20; B33Y 80/00; B22F 12/20; B22F 12/22; B22F 12/55; B22F 10/18; B22F 3/1115; B22F 2999/00; B22F 12/53
See application file for complete search history.

(56) References Cited

U.S. PATENT DOCUMENTS

| | | | | |
|---|---|---|---|---|
| 2014/0284832 | A1* | 9/2014 | Novikov | B29C 64/393 425/150 |
| 2015/0076732 | A1* | 3/2015 | Kemmer | B29C 64/118 425/375 |
| 2015/0239178 | A1* | 8/2015 | Armstrong | G06F 30/17 700/98 |
| 2016/0176123 | A1* | 6/2016 | Pedigo | B29C 70/382 264/258 |
| 2017/0266887 | A1* | 9/2017 | Roviaro | B29C 64/30 |
| 2019/0030602 | A1* | 1/2019 | Sachs | B33Y 70/00 |

(Continued)

*Primary Examiner* — Galen H Hauth
*Assistant Examiner* — Baileigh Kate Darnell
(74) *Attorney, Agent, or Firm* — Aleksandar Nikolic

(57) ABSTRACT

An apparatus for additive manufacturing having a body; a plurality of articulated arms, each having a jointed connection to the body opposite a free end, the plurality of articulated arms movable relative to each other and the plurality of articulated arms having opposable motions about the jointed connection; an extruder at the free end of each of the plurality of articulated arms, the extruder having an extruder nozzle extending from the free end; and at least one cooling nozzle extending from the free end of each of the plurality of articulated arms.

20 Claims, 15 Drawing Sheets

(56) References Cited

U.S. PATENT DOCUMENTS

| | | | |
|---|---|---|---|
| 2019/0184550 A1* | 6/2019 | Nielsen-Cole | B29C 64/118 |
| 2020/0324473 A1* | 10/2020 | Barnes | B29C 64/227 |
| 2020/0368815 A1* | 11/2020 | Baker | B33Y 40/00 |
| 2021/0213528 A1* | 7/2021 | He | B21D 26/033 |
| 2022/0049521 A1* | 2/2022 | Turnquist | E04H 12/341 |
| 2023/0270533 A1* | 8/2023 | Zegarelli | G16H 20/13 |
| | | | 427/2.29 |

* cited by examiner

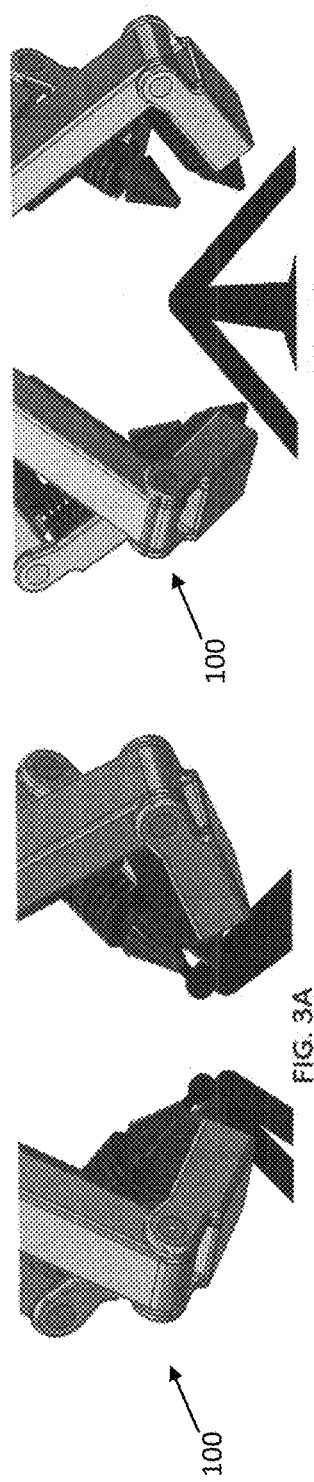
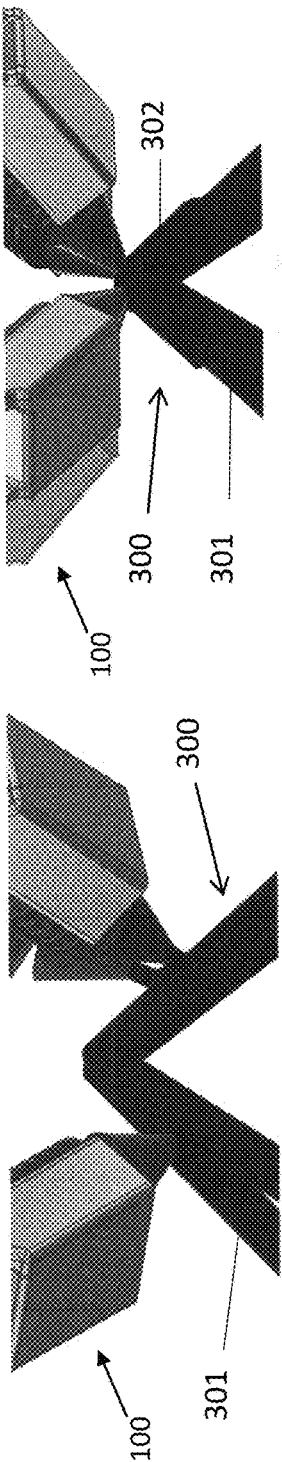
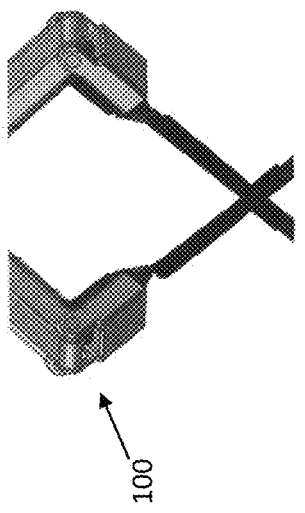

FIG. 3A Extruder system is making the lattice structure of the first layer

FIG. 3B First layer is completed

FIG. 3C The extruders create lap joints on the first layer to print the second layer FIG. 3D The extruders have finished the lap joints and have reheated the node at the top of the first layer FIG. 3E The system has completed the first lattice structure of the second layer

EXTRUSION SYSTEM FOR ADDITIVE MANUFACTURING

CROSS REFERENCE

This application claims the benefit of priority under 35 U.S.C. § 119(e) to U.S. Provisional Patent Application Ser. No. 63/263,513 filed Nov. 3, 2021, the contents of which are incorporated by reference herein as if set forth in their entirety for all purposes as if put forth in full below.

STATEMENT REGARDING FEDERALLY SPONSORED RESEARCH OR DEVELOPMENT

This invention was made with Government support under award number 2111712 awarded by the National Science Foundation. The Government has certain rights in this invention.

BACKGROUND OF THE INVENTION

Technical Field

This invention is related to additive manufacturing. More specifically, this invention is related to systems, methods, devices, and manufactures using fused filament fabrication or fused granulate fabrication for manufacturing lattice geometry structures using nonplanar toolpathings in additive manufacturing.

Background Information

Current limitations in fused filament fabrication ("FFF") and fused granulate fabrication ("FGF") systems and similar additive manufacturing methods result in parts having strength limitations due to current additive lamination processes and printing speeds.

Part strength is currently achieved when printing in free space through continuous fiber deposition. Parts formed from extrudate material lattice structures provide comparable strength. For lattice geometry structures, single nozzle fused filament fabrication (FFF) systems are currently used. However, FFF systems are both slow and create lattice structures that have poor structural strength characteristics. Current printing is done by lamination or by a deposition layer, with trusses constructed using a stack of laminations.

The current invention addresses the issue of part strength through lattice geometry and improved extrusion speed.

SUMMARY OF THE INVENTION

The present disclosure is directed toward systems, methods, devices, and manufactures using fused filament fabrication for manufacturing or pellet-based extrusion lattice geometry structures using nonplanar toolpathings in additive manufacturing.

In one aspect of the present disclosure provided herein, is an apparatus for additive manufacturing having a body; a plurality of articulated arms, each having a jointed connection to the body opposite a free end, the plurality of articulated arms movable relative to each other and the plurality of articulated arms having opposable motions about the jointed connection; an extruder at the free end of each of the plurality of articulated arms, the extruder having an extruder nozzle extending from the free end; and at least one cooling nozzle extending from the free end of each of the plurality of articulated arms.

In another aspect of the present disclosure provided herein, is a method for additive manufacturing of a structure with a lattice infill, including instructing the additive manufacturing system by programming cell positions and completed object structure information; positioning extrusion system at a starting position; beginning forming by each extruder arm, members of a unit cell; forming, by each extruder arm, members of the unit cell; forming, by one or more extruder arms, a joint connecting members of the unit cell; moving the additive manufacturing system to a next cell position; and repeating the above steps until a completed structure is formed.

These and other objects, features, and advantages of this disclosure will become apparent from the following detailed description of the various aspects of the disclosure taken in conjunction with the accompanying drawings.

BRIEF DESCRIPTION OF THE DRAWINGS

FIGS. 3A-3E, depict a unit cell of a truss at various stages of construction by the claw extrusion system of FIG. 1A, in accordance with one or more embodiments set forth herein;

DETAILED DESCRIPTION OF THE INVENTION

Figure 1A:
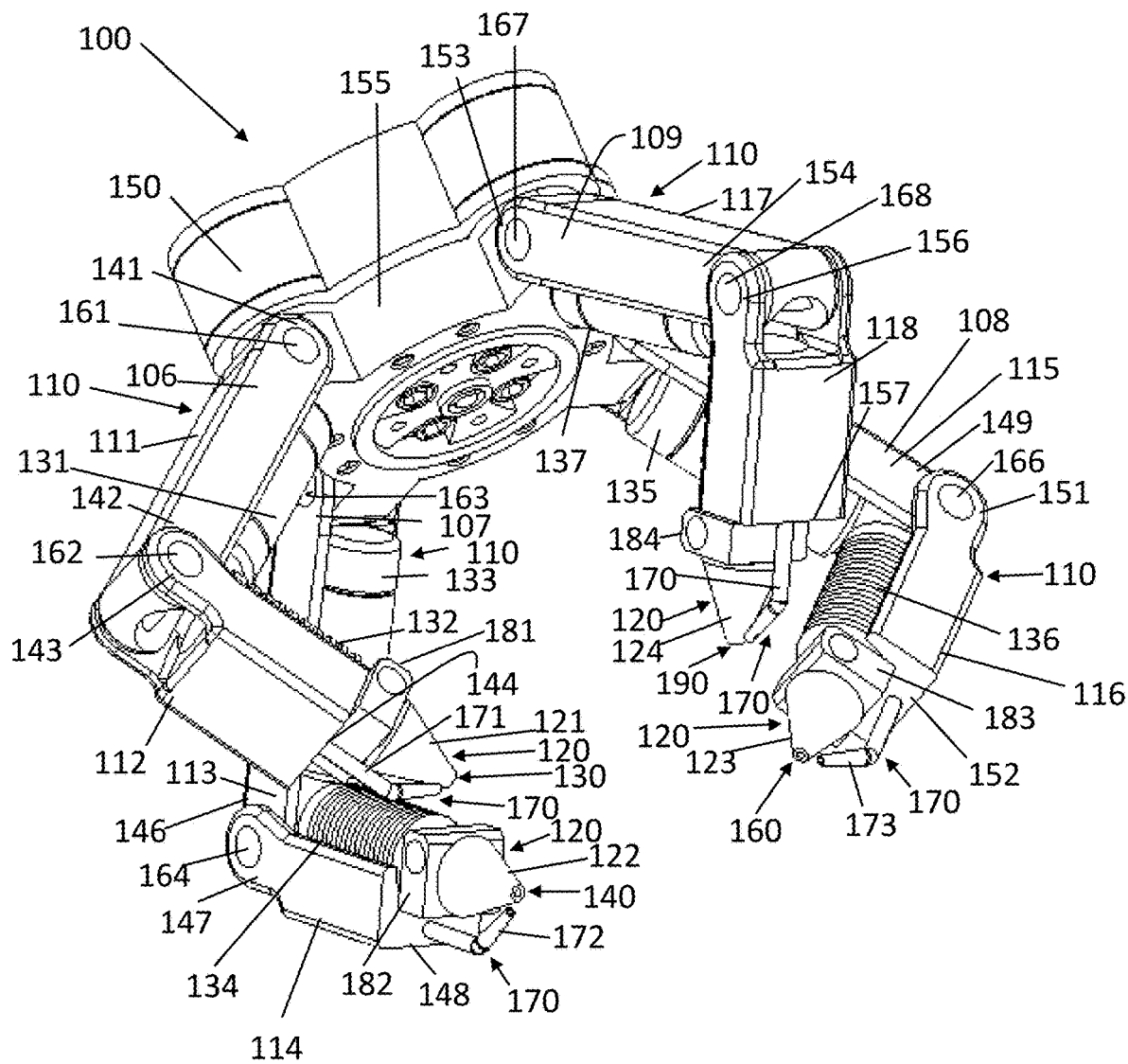
FIG. 1A, depicts a claw extrusion system, in accordance with one or more embodiments set forth herein.

Aspects of the present disclosure and certain embodiments, features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure. Furthermore, although certain methods are described with reference to certain steps that are presented herein in a certain order, in many instances, these steps may be performed in any order as may be appreciated by one having ordinary skill in the art and the methods are not limited to the particular arrangement of steps disclosed herein.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one embodiment" are not intended to be interpreted as excluding the existence of additional embodiments that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any embodiment that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be."

As used herein, the term "portion" is not limited to a single continuous body of material unless otherwise noted. A "portion" may include multiple sub-portions that may be the same or differing materials, and/or may include coatings, adhesives, and the like, and may be a separate and distinct component or may be an integral section, segment, or fragment of a larger component. As used herein, the term "coupled" is not limited to a direct coupling of two separate and distinct components. Two "coupled portions" may include indirectly coupled portions or directly coupled portions.

The invention herein will be better understood by reference to the figures wherein like reference numbers refer to like components.

Referring to the drawings, wherein like reference numerals are used to indicate like or analogous components throughout the several views, and with particular reference to FIG. 1A, an additive manufacturing extrusion apparatus or claw extrusion apparatus 100 is shown. The claw extrusion apparatus 100 may be, for example, an additive manufacturing extrusion apparatus consisting of a plurality of independently articulated extrusion nozzles. As depicted in FIG. 1A, a plurality of articulated arm extruders 110 are hingedly and rotatably connected to a body 155 and the body 155 is connected to a claw mounting member 150. The claw mounting member 150 may be, for example, mounted on a robotic movement system with at least 1 degree of freedom, such as a robot arm (e.g., a fixed base mounted robot arm) or an articulated gantry (e.g., a track mounted robot arm). However, a robotic movement system with two or more degrees of freedom provides for a greater positioning ability of the claw extrusion apparatus. The claw extrusion apparatus 100 may be, for example, positioned by the robotic movement system in three-dimensional space.

The plurality of articulated arm extruders 110 may include, for example, at least two articulated arm extruders with the number of extruders increasing to accommodate a desired lattice geometry. In FIG. 1A, four articulated arm extruders are shown. Each arm may be, for example, used to extrude material to create a unit cell in a lattice structure, with a plurality of unit cells forming an additive manufacturing product.

With continued reference to FIG. 1A, the plurality of articulated arm extruders 110 is depicted as four articulated arm extruders, a first articulated arm extruder 106, a second articulated arm extruder 107, a third articulated arm extruder 108, and a fourth arm extruder 109. Each of the plurality of articulated arm extruders 110 may have, for example, a first arm link and a second arm link, with the first arm link having a first end opposite a second end and the second arm link having a joint end opposite an extruder end. The first arm link for each of the plurality of arm extruders 110, may be, hingedly and rotatably connected to the body 155 at the first end by a first joint, with the first arm link extending away from the body 155. The second end may be hingedly and rotatably connected to the joint end of the second arm link by a second joint. The second arm link may have, for example, the extruder end opposite the joint end, with the extruder end having an extruder extending therefrom. The first articulated arm extruder 106 has an extruder 130, a second articulated arm extruder 107 has an extruder 140, a third articulated arm extruder 108 has an extruder 160, and a fourth arm extruder 109 has an extruder 190.

The first articulated arm extruder 106 may have, for example, a first link 111, with a first end 141 hingedly and rotatably connected to the body 155 by a first joint 161, with the first link 111 extending away from the body 155. The first end 141 is shown opposite a second end 142, with the second end 142 of the first link 111 hingedly and rotatably connected to a joint end 143 of the second link 112 by a second joint 162. An extruder end 144 of the second link 112 may be, for example, opposite the joint end 143. The second link 112 may have, for example, an extrusion nozzle 121 extending from the extruder end 144 of the second link 112 of the first arm 106.

The second articulated arm extruder 107 may have, for example, a first link 113, with first end 145 hingedly and rotatably connected to the body 155 by a first joint 163, with the first link 113 extending away from the body 155. The first end 145 is shown opposite a second end 146, with the second end 146 of the first link 113 hingedly and rotatably connected to a joint end 147 of the second link 114 by a second joint 164. An extruder end 148 of the second link 114 may be, for example, opposite the joint end 147. The second link 114 may have, for example, an extrusion nozzle 122 extending from the extruder end 148 of the second link 114 of the second arm 107.

Figure 1B:
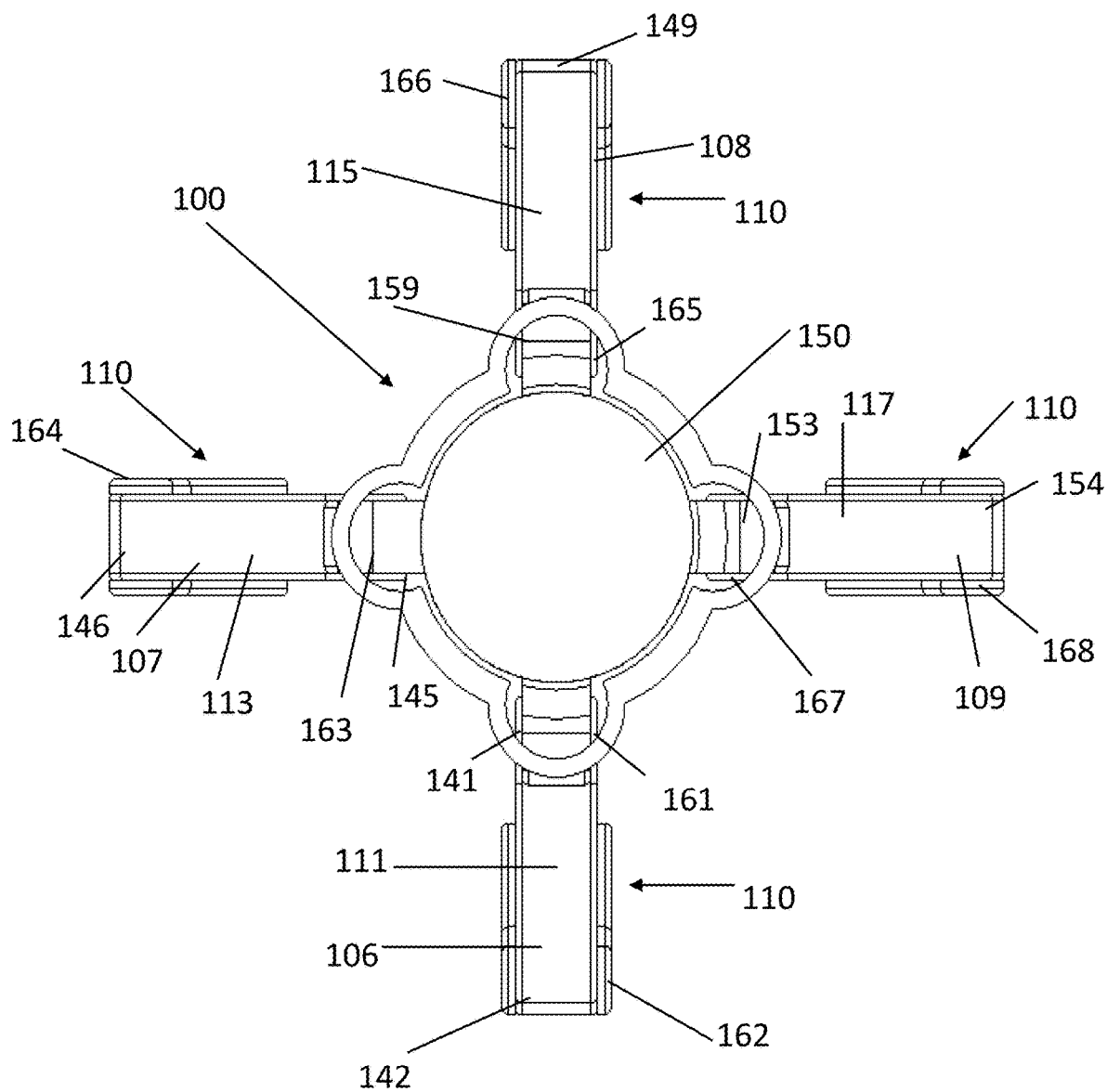
FIG. 1B, depicts a top view of the claw extrusion system of FIG. 1, in accordance with one or more embodiments set forth herein.
Figure 1C:
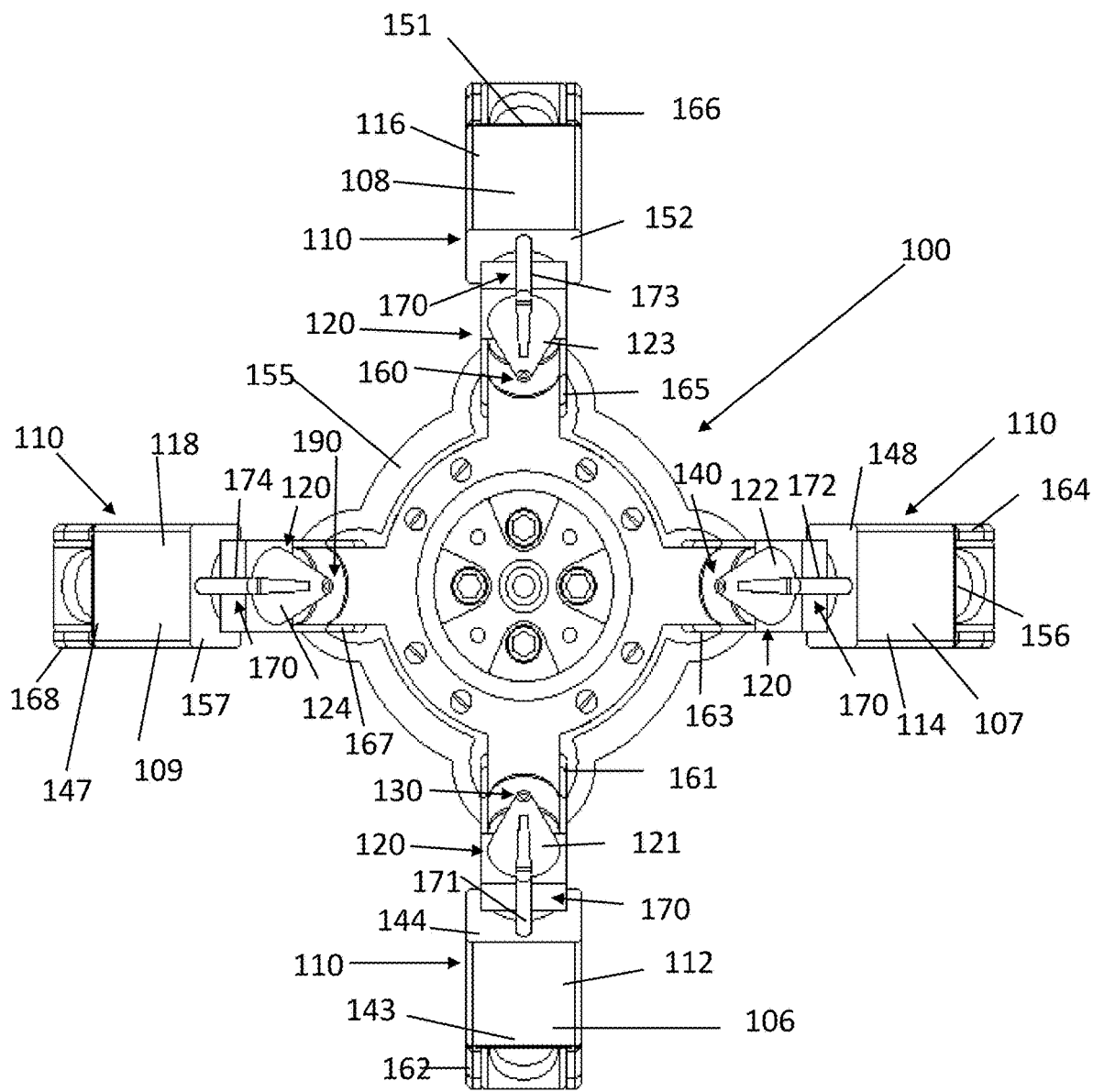
FIG. 1C, depicts a bottom view of the claw extrusion system of FIG. 1, in accordance with one or more embodiments set forth herein.

With reference to FIG. 1B, a top view of the extrusion apparatus 100 is shown. With reference to FIG. 1C, a bottom view of the extrusion apparatus 100 is shown.

Referring to FIGS. 1A and 1B, the third articulated arm extruder 108 may have, for example, a first link 115, with first end 159 hingedly and rotatably connected to the body 155 by a first joint 165, with the first link 115 extending away from the body 155. The first end 159 is opposite a second end 149, with the second end 149 of the first link 115 hingedly and rotatably connected to a joint end 151 of a second link 116 by a second joint 166. Referring to FIGS. 1A and 1C an extruder end 152 of the second link 116 may be, for example, opposite the joint end 151. The second link 116 may have, for example, an extrusion nozzle 123 extending from the extruder end 152 of the second link 116 of the third arm 108.

Referring to FIGS. 1A and 1B, the fourth articulated arm extruder 109 may have, for example, a first link 117, with first end 153 hingedly and rotatably connected to the body 155 by a first joint 167, with the first link 117 extending away from the body 155. The first end 153 is shown opposite a second end 154, with the second end 154 of the first link 117 hingedly and rotatably connected to the joint end 156 of a second link 118 by a second joint 168. Referring to FIGS. 1A and 1C an extruder end 157 of the second link 118 may be, for example, opposite the joint end 156. The second link 118 may have, for example, an extrusion nozzle 124 extending from the extruder end 157 of the second link 118 of the second arm 107.

The plurality of articulated arm extruders 110 of FIG. 1A, are shown hingedly and rotatably connected to the body 155, such that the connections to the body of adjacent articulated arm extruders are approximately equidistant from each other and non-adjacent articulated arm extruders are connected to the body 155 such that the non-adjacent articulated arm extruders may be opposite and equidistant from each other. The first arm 106, the second arm 107, the third arm 108, and the fourth arm 109 are shown connected to the body 155 as at the corners of a square or in a cross shape. With reference to FIGS. 1B and 1C, first arm 106 is depicted as being on the opposite side of body 155 from third arm 108 and second arm 107 is depicted as being on the opposite side of body 155 from fourth arm 109.

With reference to FIGS. 1A-1C, for example, first arm 106 may move opposably relative to third arm 108 and second arm 107 may move opposably relative to fourth arm 109. The extruder nozzle opening (e.g., representative extruder nozzle opening 125) of first arm 106 may be moved rotatably about joint 161 and joint 162 and the extruder nozzle opening of third arm 108 may be moved rotatably about joint 165 and joint 166 to be in near contact with each other or to face in opposite direction with first arm 106 and third arm 108 are inline. The extruder nozzle opening (e.g., representative extruder nozzle opening 125) of second arm 107 may be moved rotatably about joint 163 and joint 164 and the extruder nozzle opening of third arm 109 may be moved rotatably about joint 167 and joint 168 to be in near contact with each other or to face in opposite direction with second arm 107 and fourth arm 109 are inline. The motion of the arms (e.g., first arm 106, second arm 107, third arm 108, and fourth arm 109) may range from a position such that the extruder nozzle openings (e.g., representative extruder nozzle opening 125) may be in near contact to a cross shape with opposing pairs of nozzles facing in opposite directions, and with the arms independently movable relative each other within that range.

Other embodiments may have arms in different configurations with regular or uneven spacing. In still other embodiments, there may be, for example, two arms or three arms or there may be more than four arms. Embodiments with configurations of arms having an even number may, for example, be hingedly connected to the body (e.g., body 155) with arms paired at opposite ends of the body, and with such pairs of arms having opposable motions relative to each other. Opposable motions may be directly opposable or indirectly opposable. Embodiments with configurations having an odd number of arms may, for example, be hingedly connected to the body (e.g., body 155) with constant spacing between arms. In odd numbered configurations opposable movements may be indirect, with joints moving at an angle to each other rather than directly opposable relative to each other. In still further embodiments, the number of arms may be odd or even and the spacing between arms may not be regular. In some embodiments where arm spacing is not regular or the number of arms may be odd, the arms may, for example, have opposable motions but the opposable motions may be indirectly opposable or opposable at an angle to each other.

Figure 2A:
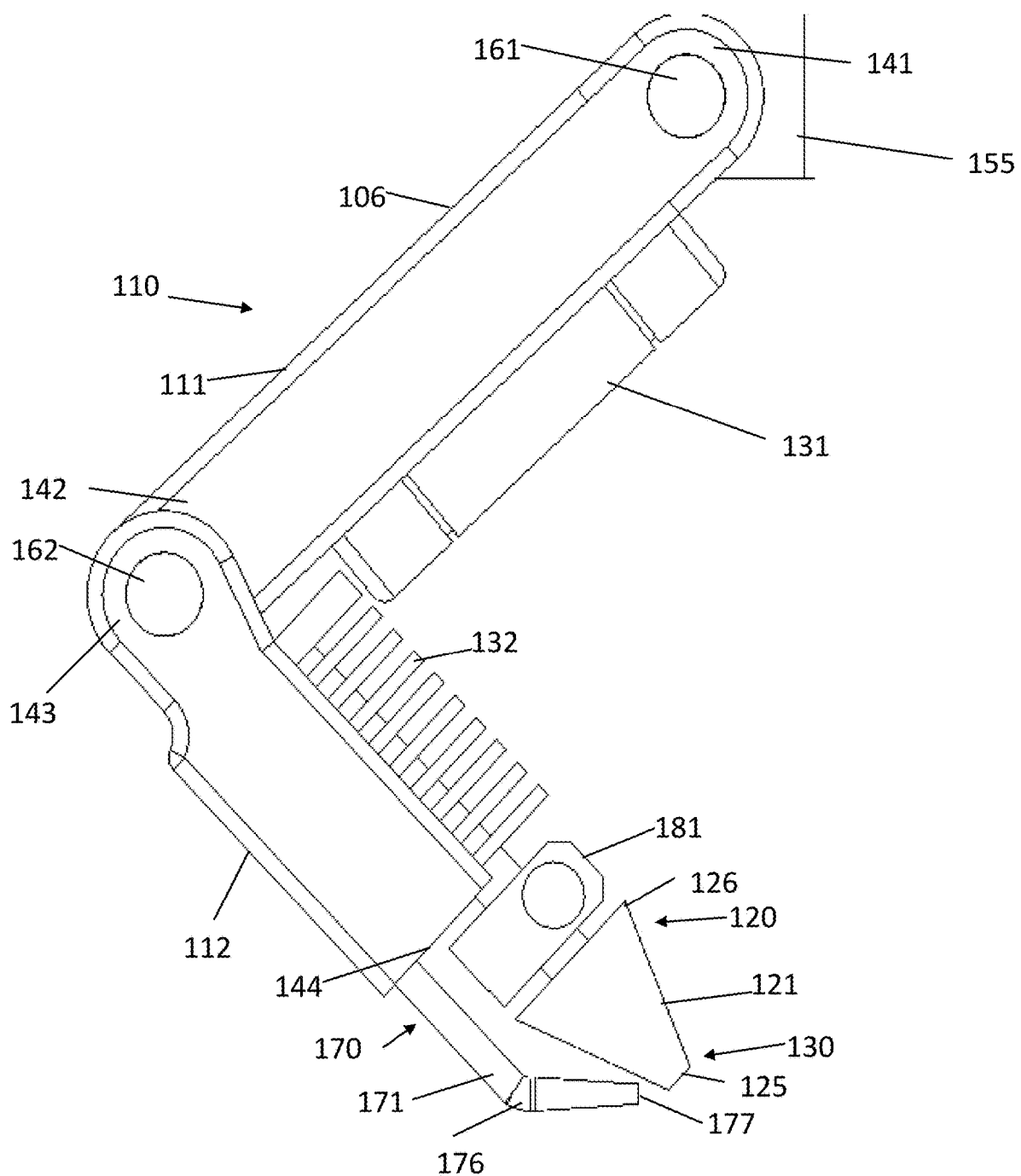
FIG. 2A, depict a perspective view of the extruder nozzle and cooling nozzle of the claw extrusion system of FIG. 1A, in accordance with one or more embodiments set forth herein.

As depicted in FIG. 1A, each of the plurality of articulated arm extruders 110 have at least two degrees of freedom as each of the arms is rotatably movable about its respective joints. With reference to FIG. 2A, the first arm 106 is shown having a first arm actuator 131. The first arm actuator 131 may be, for example, positioned between the first joint 161 and the second joint 162, with the actuator 131 connected to both the first joint 161 and the second joint 162. The actuator 131 may be, for example, a hydraulically operated, a pneumatically operated, or an electrically operated rotating crankshaft apparatus. The actuator 131 rotatably moves the first link 111 at the first end 141 about the first joint 161, and rotatably moves the second link 112 at the joint end about the second joint 162. Joint 161 and 162 may be, for example, pin joints driven by the actuator 131. While actuator 131 is shown, there may be embodiments with a plurality of actuators aiding in moving links and joints.

Figure 2B:
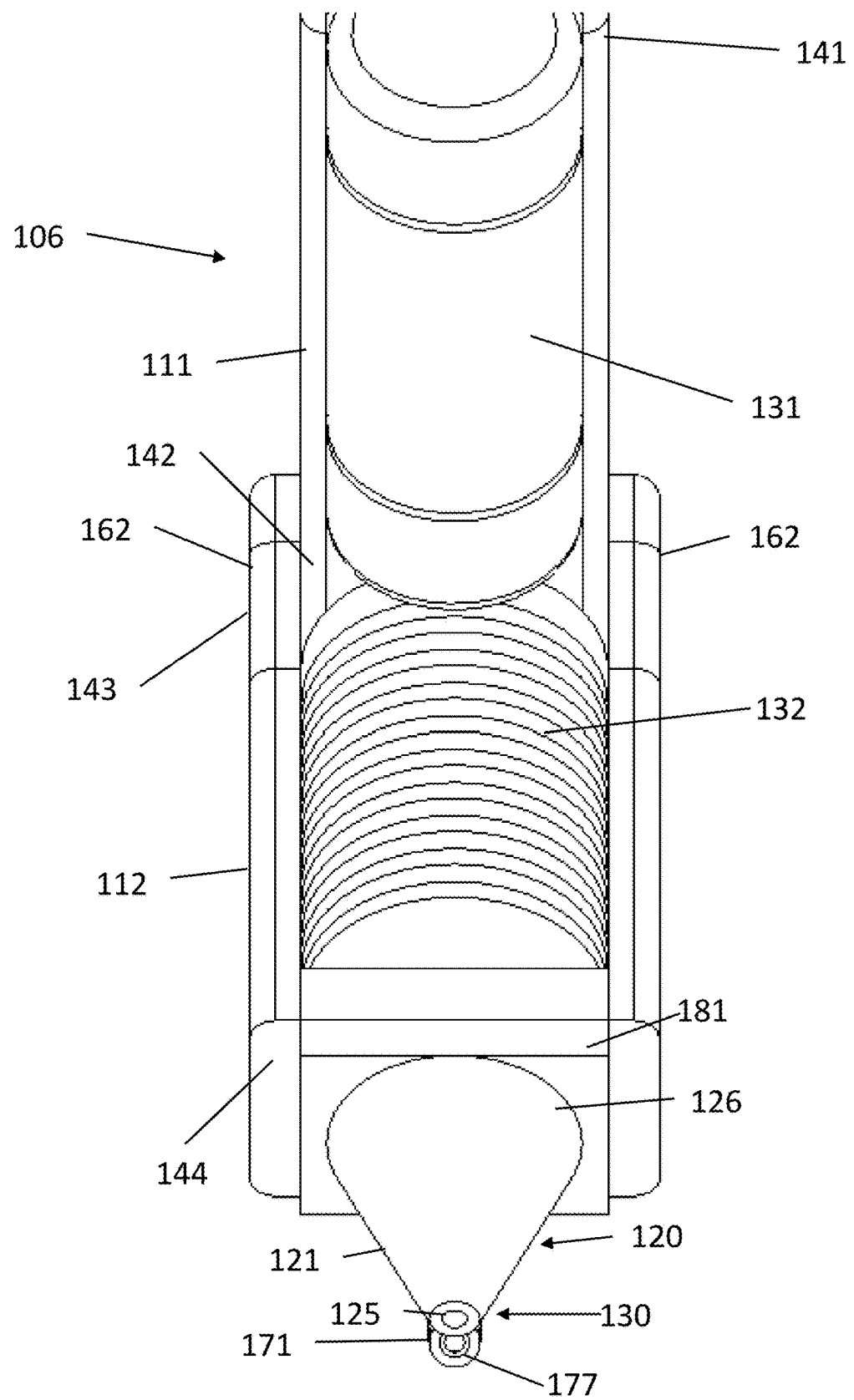
FIG. 2B, depict a front view of the extruder nozzle and cooling nozzle of the claw extrusion system of FIG. 1A, in accordance with one or more embodiments set forth herein.
Figure 2C:
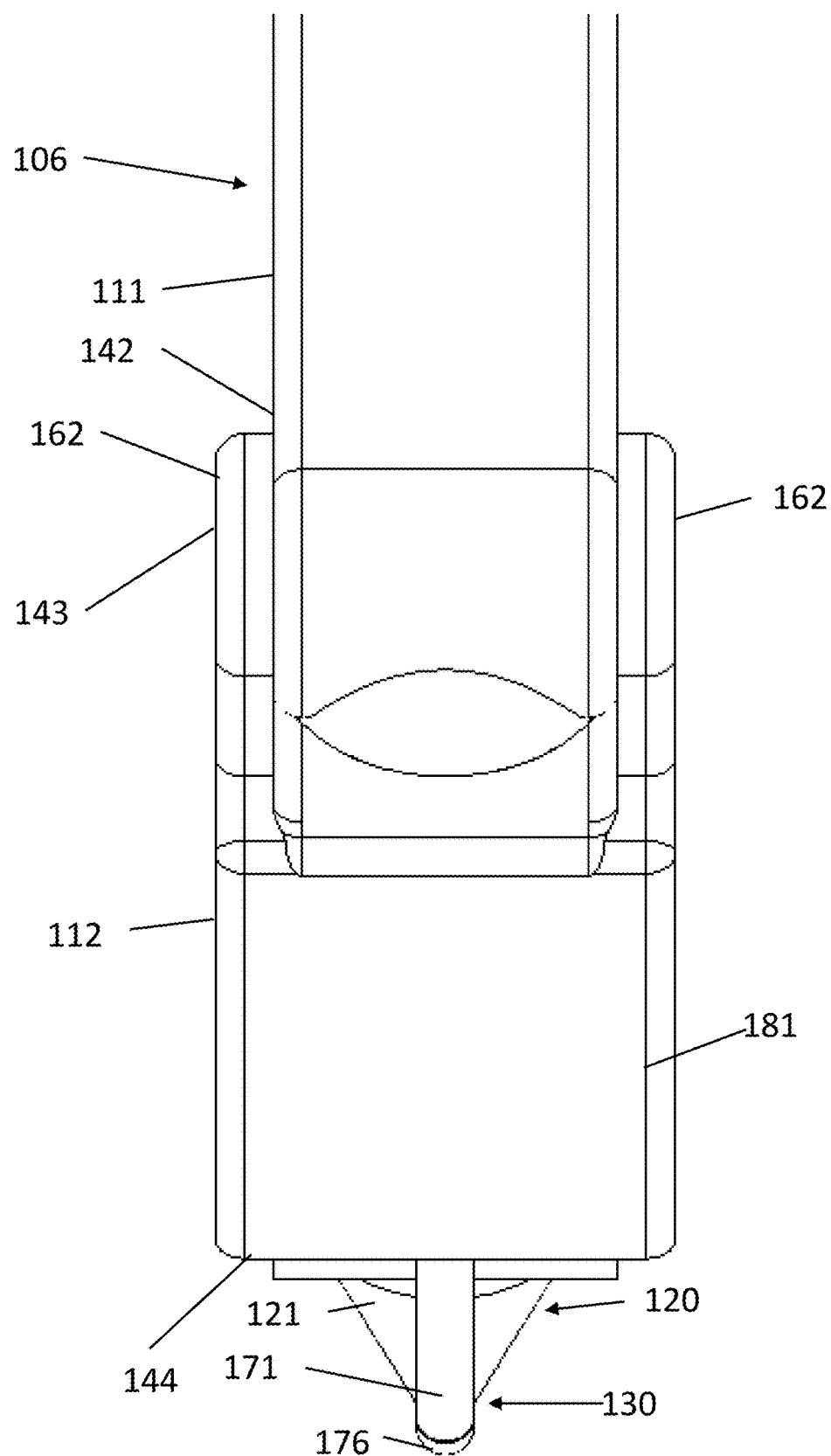
FIG. 2C, depicts a rear view of the extruder nozzle and cooling nozzle of the claw extrusion system of FIG. 1A, in accordance with one or more embodiments set forth herein.

With further reference, FIG. 2B shows a front view of first arm 106 and FIG. 2C shows a rear view of first arm 106.

The first arm 106 shown in FIGS. 2A-2C is a representative arm for second arm 107, third arm 108, and fourth arm 109. With reference to FIGS. 1A and 2A-2C, the operation of second arm 107, third arm 108, and fourth arm 109 is described. The second arm 107 is shown having a first arm actuator 133. The first arm actuator 133 may be, for example, positioned between the first joint 163 and the second joint 164, with the actuator 133 connected to both the first joint 163 and the second joint 164. The actuator 133 may be, for example, a hydraulically operated, a pneumatically operated, or an electrically operated rotating crankshaft apparatus. The actuator 133 rotatably moves the first link 113 at the first end 145 about the first joint 163, and rotatably moves the second link 114 at the joint end about the second joint 164. Joint 163 and 164 may be, for example, pin joints driven by the actuator 133. While actuator 133 is shown, there may be embodiments with a plurality of actuators aiding in moving links and joints.

The third arm 108 is shown having a first arm actuator 135. The first arm actuator 135 may be, for example, positioned between the first joint (not shown) and the second joint 166, with the actuator 135 connected to both the first joint (not shown) and the second joint 166. The actuator 135 may be, for example, a hydraulically operated, a pneumatically operated, or an electrically operated rotating crankshaft apparatus. The actuator 135 rotatably moves the first link 115 at the first end (not shown) about the first joint (not shown), and rotatably moves the second link 116 at the joint end about the second joint 166. The first joint (not shown) and the second joint 162 may be, for example, pin joints driven by the actuator 135. While actuator 135 is shown, there may be embodiments with a plurality of actuators aiding in moving links and joints.

The fourth arm 109 is shown having a first arm actuator 137. The first arm actuator 137 may be, for example, positioned between the first joint 167 and the second joint 168, with the actuator 137 connected to both the first joint 167 and the second joint 168. The actuator 137 may be, for example, a hydraulically operated, a pneumatically operated, or an electrically operated rotating crankshaft apparatus. The actuator 137 rotatably moves the first link 117 at the first end 153 about the first joint 167, and rotatably moves the second link 118 at the joint end about the second joint 168. Joint 167 and 168 may be, for example, pin joints driven by the actuator 137. While actuator 137 is show, there may be embodiments with a plurality of actuators aiding in moving links and joints.

Thus, first arm 106 and third arm 108 extend from opposite sides of body 155 but are movable such that first arm 106 may rotatably move about joint 161 towards or away from third arm 108 and third arm 108 may rotatably move about joint 165, towards or away from first arm 106. Second link 112 of first arm 106 may rotatably move about joint 162 towards or away from third arm 108 and second link 116 of third arm 108 may rotatably move about joint 166 towards or away from first arm 106.

Similarly, second arm 107 and fourth arm 109 extend from opposite sides of body 155 but are movable such that second arm 107 may rotatably move about joint 163 towards or away from fourth arm 109 and fourth arm 109 may rotatably move about joint 167, towards or away from second arm 108. Second link 114 of second arm 107 may rotatably move about joint 164 towards or away from fourth arm 109 and second link 118 of fourth arm 109 may rotatably move about joint 168 towards or away from second arm 107.

The actuators (e.g., actuator 131, actuator 133, actuator 135, and actuator 137) move the links about the joints of each of the plurality of articulated extrusion arms 110 (e.g., arm 106, arm 107, arm 108, and arm 109) and provide independent movement for each of the articulated extrusion arms 110 relative to each other.

With continued reference to FIGS. 1A-1C, each of the plurality of articulated arm extruders 110 has an extruder 120 (e.g., extruder 130, extruder 140, extruder 160, and extruder 190) and a cooling nozzle 170 (e.g., cooling nozzle 171, cooling nozzle 172, cooling nozzle 173, and cooling nozzle 174).

The extruder 130 of the first arm 106 has a heat sink 132 connected to second link 112 and extending between the joint end and the extruder end 144 of the second link 112. A heat block 181 is located at the extruder end 144, with an extrusion nozzle 121 connected to the heat block 181 and extending therefrom. Also, extending from the extruder end 144 of the second link 112 and adjacent to the heat block 181 and the extrusion nozzle 121 is a cooling nozzle 171.

The extruder 140 of the second arm 107 has a heat sink 134 connected to second link 114 and extending between the joint end and the extruder end 148 of the second link 114. A heat block 182 is located at the extruder end 148, with an extrusion nozzle 122 connected to the heat block 182 and extending therefrom. Also, extending from the extruder end 148 of the second link 114 and adjacent to the heat block 182 and the extrusion nozzle 122 is a cooling nozzle 172.

The extruder 160 of the third arm 108 has a heat sink 136 connected to second link 116 and extending between the joint end and the extruder end 152 of the second link 116. A heat block 183 is located at the extruder end 152, with an extrusion nozzle 123 connected to the heat block 183 and extending therefrom. Also, extending from the extruder end 152 of the second link 116 and adjacent to the heat block 183 and the extrusion nozzle 123 is a cooling nozzle 173.

The extruder 190 of the fourth arm 109 has a heat sink (not shown) connected to second link 118 and extending between the joint end and the extruder end 157 of the second link 118. A heat block 184 is located at the extruder end 157, with an extrusion nozzle 124 connected to the heat block 184 and extending therefrom. Also, extending from the extruder end 157 of the second link 118 and adjacent to the heat block 184 and the extrusion nozzle 124 is a cooling nozzle 174.

In FIGS. 1A and 1C, a single cooling nozzle is shown for each extruder for each arm. In other embodiments there may be, for example, more than one cooling nozzle. Thus, there may be a plurality of cooling nozzles 171, a plurality of cooling nozzles 172, a plurality of cooling nozzles 173, and a plurality of cooling nozzles 174.

With continued reference to FIG. 1, the heat sink 132 may be, for example, a representative depiction of the other heat sinks (e.g., heat sink 134, heat sink 136, and the fourth arm heat sink (not shown)). The heat sink 132 may be, for example, a structure made from a conductive material with ribs, plates, or fins extending from a central body having one end connected to heat block 181 at or near the extruder end 144 of the second link 112. The extrusion nozzle 121 may be, for example, connected to the heat block 181 at an end of the extruder opposite the heat sink 132, such that the heat block 181 is between the heat sink 132 and the extrusion nozzle 121. Through the central body and the rib, plates, or fins, the heat sink 132 conducts heat away from the heat block 181.

The component combination of the heat sink (e.g. heat sink 132, heat sink 134, heat sink 136, and the fourth arm heat sink (not shown)), the heat block (e.g., heat block 181, heat block 182, heat block 183, and heat block 184), the extrusion nozzle (e.g., extrusion nozzle 121, extrusion nozzle 122, extrusion nozzle 123, and extrusion nozzle 124), and the cooling nozzle (e.g., cooling nozzle 171, cooling nozzle 172, cooling nozzle 173, and cooling nozzle 174) form an extruder apparatus through which a filament material is inserted and extrudate material is expelled.

Figure 4A:
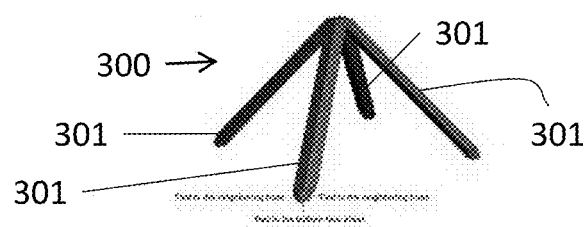
FIG. 4A, depicts a lattice unit cell, in accordance with one or more embodiments set forth herein.

The plurality of articulated arm extruders 110 may, for example, move in a coordinated manner, in relation to each other, with each depositing extrudate material from each respective extruder 120 to from non-planar structures. The claw extrusion apparatus 100, having a plurality articulated arm extruders 110, such that each of the plurality of articulated arm extruders 110 may, for example, extrude a segment of a unit cell with the plurality of articulated arm extruders moving together to provide for extrudate material to come out of the extruder 120 to form a completed unit cell having a plurality of segments connected at a joint. The plurality of articulated arm extruders 110 provides for faster construction over a single extruder performing the same task. The plurality of unit cells may, for example, form a finished product having, for example, a lattice or truss structure. With reference to FIG. 4A, a pyramidal unit cell is shown with four joined segments.

With reference to FIGS. 2A-2C, a close-up of various views of the extruder 120 extrusion nozzle 121, the heat block 181, and the cooling nozzle 171 at the extruder end 144 of the second link 112 of the first arm 106 are shown.

The extrusion nozzle 121 has a conical shape with a nozzle opening 125 at a tip end opposite a wider base end 126. The extrusion nozzle 121 is shown connected to the heat block 181 by a tube extending from the heat block 181 and through base end 126, with the tube extending through the extrusion nozzle 121 with the end of the tube forming the extrusion nozzle opening 125. The hollow tube forms a passage between the heat sink 132 and the extrusion nozzle opening 125. In other embodiments, the extrusion nozzle 121 may extend directly from the heat block 181, with a passage extending from the heat sink 132 to the extrusion nozzle opening 125. Continuing with reference to FIGS. 2A-2C, extending out from the extruder end 144 of the first arm 106 is the cooling nozzle 171, a tubular structure having a nozzle opening 177 at an end away from the extruder end 144. The cooling nozzle may extend into and through the second link 112, where it may be connected to a pump or a compressor. The pump or compressor may, for example, pump fluid through the cooling nozzle 171. The cooling fluid may be, for example, a gas such as air or nitrogen. In other embodiments, other fluids may be used. Along the length of the cooling nozzle 171 may be, for example, a curved section or elbow 176, providing positioning for the nozzle opening 177 for placement at or near the extrusion nozzle opening 125.

With continued reference to FIGS. 2A-C, the heat block 181 may have, for example, filament material (not shown) inserted through the heat sink 132 and into the heat block 181. The heat block 181 may include, for example, a heater (also referred to as a heat cartridge), a thermal sensor (thermistor or thermocouple), a passage from the heat sink 132 and through the extrusion nozzle 121 to opening 125 along which the filament material passes, and a material delivery system. The material delivery system may be, for example, a direct drive or a Bowden drive (not shown). The heat block 181, the material delivery system pulls the filament material into the heat block 181, heating the filament material using the heater within, and forcing the filament material through the connected extrusion nozzle 121, and extruding the material through the extrusion nozzle 121. The general internal structure and operation of the heat block 181 may be considered representative of the structure and operation of heat block 182, heat block 183, and heat block 184. The heat sink 132 is connected to the heat block 181 and is configured (e.g., shaped and dimensioned) to dissipate heat such that the filament material is solid entering the heat sink 132 and remains at a temperature to keep the filament material below the filament material's glass transition temperature throughout the filament material's movement along the passage through the heat sink. Upon entering the heat block 181, the temperature of the passage along which the filament material passes through the heat block 181 is such that the temperature of the filament material is maintained at or above the glass transition temperature along the passage through the heat block 181. The filament material temperature is maintained at or above the glass transition temperature until the filament leaves the extrusion nozzle opening 125 as extrudate (see FIGS. 2A-2C). Heat sink 132 is representative of the structure and operation of heat sink 134, heat sink 136, and the fourth arm heat sink (not shown). The filament material used for extrusion may include, but is not limited to, a polymer, a metal, or a fiber reinforced polymer or metal. Common filler materials including but not limited to polymers, thermoplastic, thermoset, ceramics, metals, composites, etc. Composite filament materials may include combinations of such filament materials and filler materials such as, for example a plastic material combined with a metal powder or metal fibers.

During operation of the heat block 181, the extrusion nozzle opening 125 and the cooling nozzle opening 177 are within close proximity to each other such that the extrusion nozzle 171 and the extrudate material through the extrusion nozzle opening 125 may be, for example, cooled by fluid expelled from the cooling nozzle opening 177. By providing cooling as the extrudate exits the extrusion nozzle opening 125, members are cooled at an even rate and provide for fluid to fluid extrudate formed joints because members are simultaneously extruded. Cooling may result in member bonds that connect in the fluid to fluid state but the cooling rate may be adjusted to achieve a temperature of the extrudate at or below the glass transition temperature. The fluid may also, for example, be expelled from the cooling nozzle opening 177 onto the extrusion nozzle 171 to cool or maintain temperature of the extrusion nozzle 171.

While the extrusion nozzle 121, heat block 181, and the cooling nozzle 171 have been described for the first arm 106, it may be considered representative of the structure, shape, and dimension of extrusion nozzles (e.g., extrusion nozzle 122, extrusion nozzle 123, and extrusion nozzle 124), extruders (e.g. heat block 182, heat block 183, and the fourth arm extruder (not shown), and cooling nozzles (e.g., cooling nozzle 172, cooling nozzle 173, and cooling nozzle 174).

The claw extrusion apparatus 100 may be, for example, connected to a computer having a processor, memory, storage media, and networking on which software provides instructions controlling and operating the claw extrusion apparatus 100.

With reference to FIGS. 1A-2C, the extrusion nozzle 121, the heat block 181, the heat sink 132, and the cooling nozzle 171 of the extruder 130 of the first arm 106 may, in certain embodiments be connected to an extruder joint. The extruder joint may be, for example, connected to an end of the heat sink 132 opposite the heat block 181. The extruder 130 may, for example, rotatably move about the extruder joint, such that the extruder 130 may have, for example, two degrees of freedom and move relative to the second link 112. The extruder 130 may, for example, move from an approximately parallel position to a position where the extruder 130 forms an angle at the extruder joint with the second link 112. The extruder 130 may, for example, rotatably move about the extruder joint, such that the extruder 130 has two degrees of freedom. The extruder 130 may, for example, move from an approximately parallel position to a position where the extruder 130 forms an angle at the extruder joint with the second link 112. Similarly, extruder 140 may be connected at an extruder joint to an end of the heat sink 134 opposite the heat block 182; extruder 160 may be connected at an extruder joint to an end of the heat sink 136 opposite the heat block 183; and extruder 190 may be connected at an extruder joint to an end of the heat sink (not shown) opposite the heat block 184.

Referring to FIG. 3A-3E, claw extrusion apparatus 100 is depicted constructing a cell unit 300 of a lattice structure. With reference to FIG. 3A, the articulated arm extruders 110 are shown extruding members 301 of a cell unit 300 through extruder 120. Each extruder 120 may, for example, move independently in a non-planar direction and provide extrudate to form the members of a cell unit 300. FIG. 3B depicts a cell unit 300 having joined members, as depicted in the cell unit 300 of FIG. 4A. The cell unit 300 has a pyramidal structure. In FIG. 3C, joint reinforcement is provided by the articulated arm extruders 110 forming a lap joint by adding a second layer of extrudate to a portion of each member 301 continuing to the joint as depicted in FIG. 3D. Once a first cell is completed, FIG. 3E depicts members of a second cell extending from the lap joint 302, with the members 301 forming a cell 300 on an inverted pyramidal structure. The articulated arm extruders 110 are depicted with extruder 120 being at or close to a point in FIG. 3D. In FIG. 3E, the articulated arm extruders 110 are depicted as being apart having formed the members of an adjacent cell extending from a vertex formed by the members of the initial cell, where the adjacent cell may, for example, form an inverted pyramidal structure. While use of the lap joint 302 is shown in FIGS. 3D and 3E, the pyramidal cell with an adjacent inverted pyramidal cell may be formed without forming the lap joint 302. The robot movement system may, for example, assist in positioning the claw extruder apparatus 100 during unit cell manufacturing and assist in positioning to a subsequent unit cell position, until each cell with a manufactured product is completed.

A controller may be used to receive instructions and to provide positioning to the robotic movement system. The controller may also provide positioning or movement instructions to the claw extrusion apparatus 100. The controller may be, for example, a computer having a processor, memory, storage media, and networking equipment on which programmed software provides instructions controlling and operating the claw extrusion apparatus 100 and the positioning of the claw extrusion apparatus 100. The controller may also be configured to provide instructions on positioning the individual arms of the claw extrusion apparatus during operation.

Cells constructed by a plurality of articulated arm extruders may provide, for example, bonds that are a fluid form, providing fluid to fluid member bonding. Adjacent cell units (e.g., cell unit 300) may be, for example, formed from fluid to fluid bonds.

Other embodiments of the claw extrusion apparatus 100 may have more articulated arm extruders and may be connected to the body 155 to form different lattice geometries.

Figure 4B:
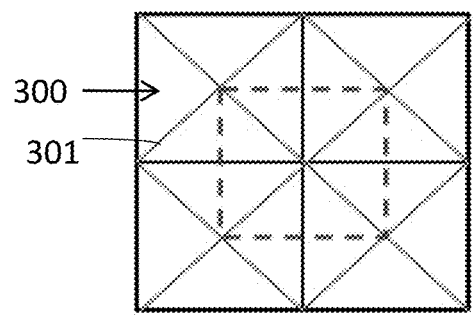
FIG. 4B, depicts a top view of lattice cells, in accordance with one or more embodiments set forth herein.
Figure 4C:
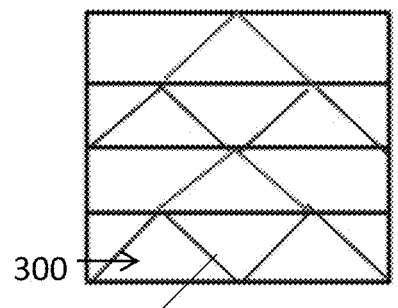
FIG. 4C, depicts a side view of lattice cells, in accordance with one or more embodiments set forth herein.

FIG. 4A depicts the single cell unit 300. FIG. 4B depicts a top view of a plurality of pyramidal cells, forming an infill lattice or truss structure within perimeter walls. FIG. 4C, depicts a side view of the pyramidal lattice structure of 4B with perimeter walls. The pyramidal cells are referred to as unit cells in FIG. 4B. For example, the unit cell of FIG. 4B may also be referred to as an "octet" because the unit cell includes a four member square base, having each of four members extending from a corner of the square base toward a common point, and forming a pyramidal structure. However, any infill member formed shape geometry may be used.

Figure 4D:
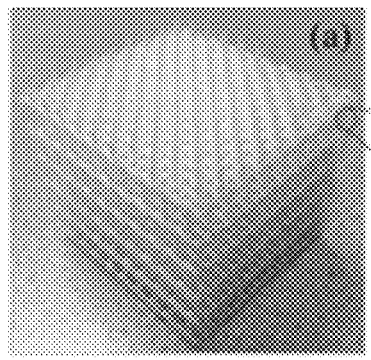
FIG. 4D, depicts a free standing lattice structure as made from layered laminate structures.
Figure 4E:
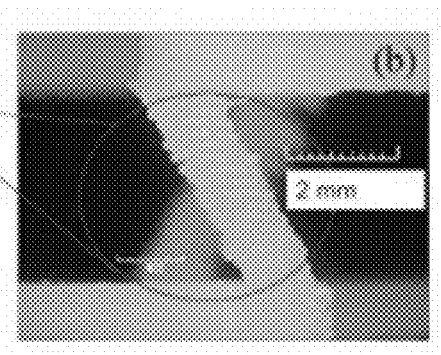
FIG. 4E, depicts a close-up of a lattice member from the free standing lattice structure of FIG. 4D.

FIG. 4D depicts a lattice formed using existing extrusion methods, which form cell members through laminate layering as shown in FIG. 4E. Laminate layering is an extrusion method where extrudate is extruded in a plurality of layers to form a lattice cell member.

Figure 4F:
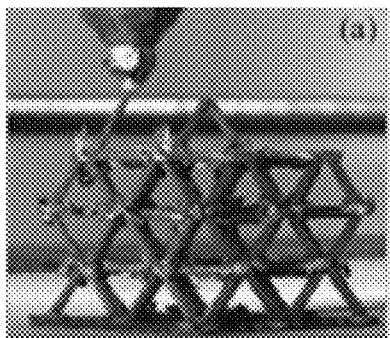
FIG. 4F, depicts a free standing lattice structure formed from a single extruder.
Figure 4G:
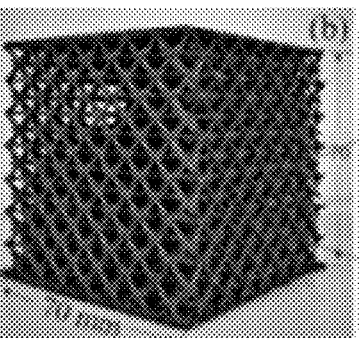
FIG. 4G, depicts a free standing lattice structure.
Figure 4H:
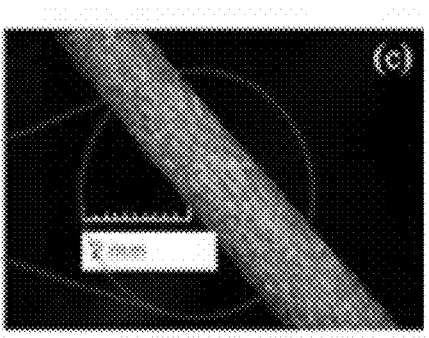
FIGS. 4H, depict a close-up of a member of the free standing lattice structure for FIG. 4G.

FIG. 4F depict a partially constructed free standing lattice structure with alternating levels of pyramidal unit cells and inverted pyramidal unit cells, with the free standing lattice structure being extruded from a single nozzle. FIG. 4G depicts a completed version of the free standing lattice structure of FIG. 4F. FIG. 4H depicts a portion of cell member made by a single continuous extrusion of extrudate as opposed to laminate layering. The structures depicted in FIGS. 3A-3F, is the unit cell forming the structures depicted in FIGS. 4F-4H.

Forming members from a single continuous extrusion as opposed to laminate layering provides for stronger members because a member is formed of a fluid to fluid bond rather than fluid to solid as in layered laminations. The single continuous extrusion provides for a faster manufacturing method as the extruder does not need to move laterally to form layers but moves or is moved through a space to directly form a member.

With reference to FIGS. 3A-4H, the cellular infill structure depicted is a pyramidal and/or inverted pyramidal one, with uniform cells. However, the cellular structure need not be pyramidal and may be configured (e.g., shaped and dimensioned) using extruded members to form any three-dimensional truss structure. Truss structures may be used and the trusses may, for example, be similarly or dissimilarly shaped and dimensioned within a single unit cell. Furthermore, a final structure may be composed of uniform or non-uniform unit cells.

Figure 5:
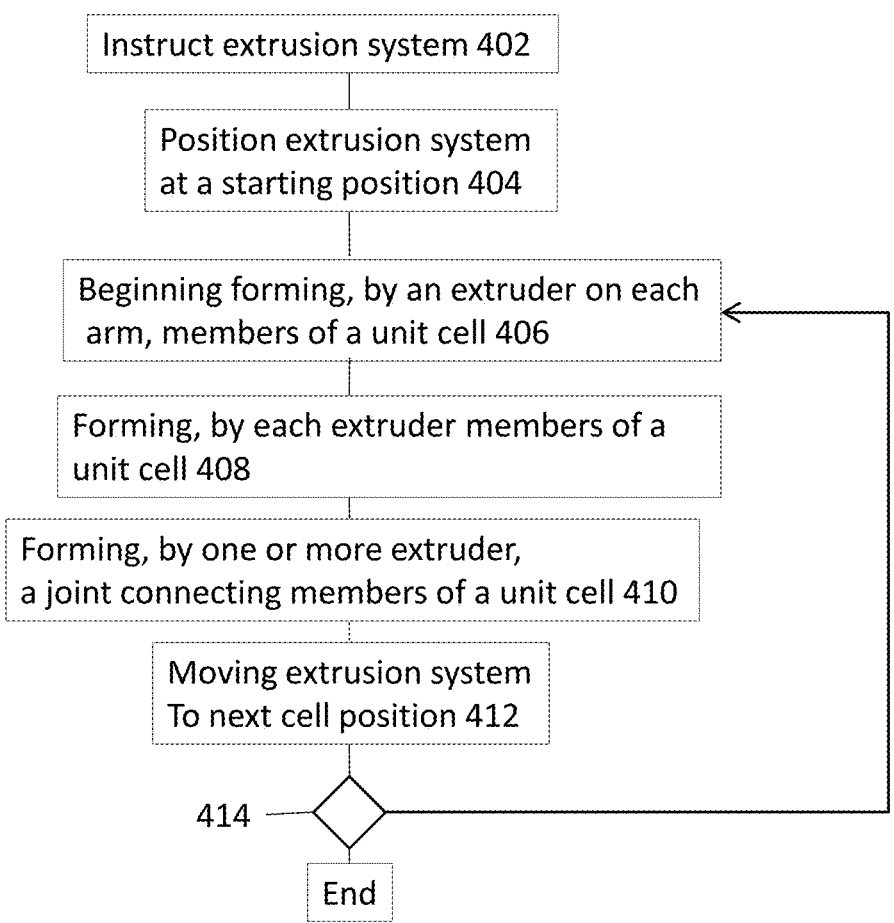
FIG. 5 depicts a block diagram of the method for making a lattice structure using an extrusion system, in accordance with one or more embodiments set forth herein.

With reference to FIG. 5, a method for additive manufacturing of a lattice structure is depicted. The method steps include: instructing the additive manufacturing system by programming cell positions and completed object structure information 402; positioning extrusion system at a starting position 404; beginning forming, by each extruder arm, members of a unit cell 406; forming, by each extruder arm, members of the unit cell 408; forming, by one or more extruder arms, a joint connecting members of the unit cell 410; moving the additive manufacturing system to a next cell position 412; and repeating the above steps until a completed structure is formed 414.

Figure 6:
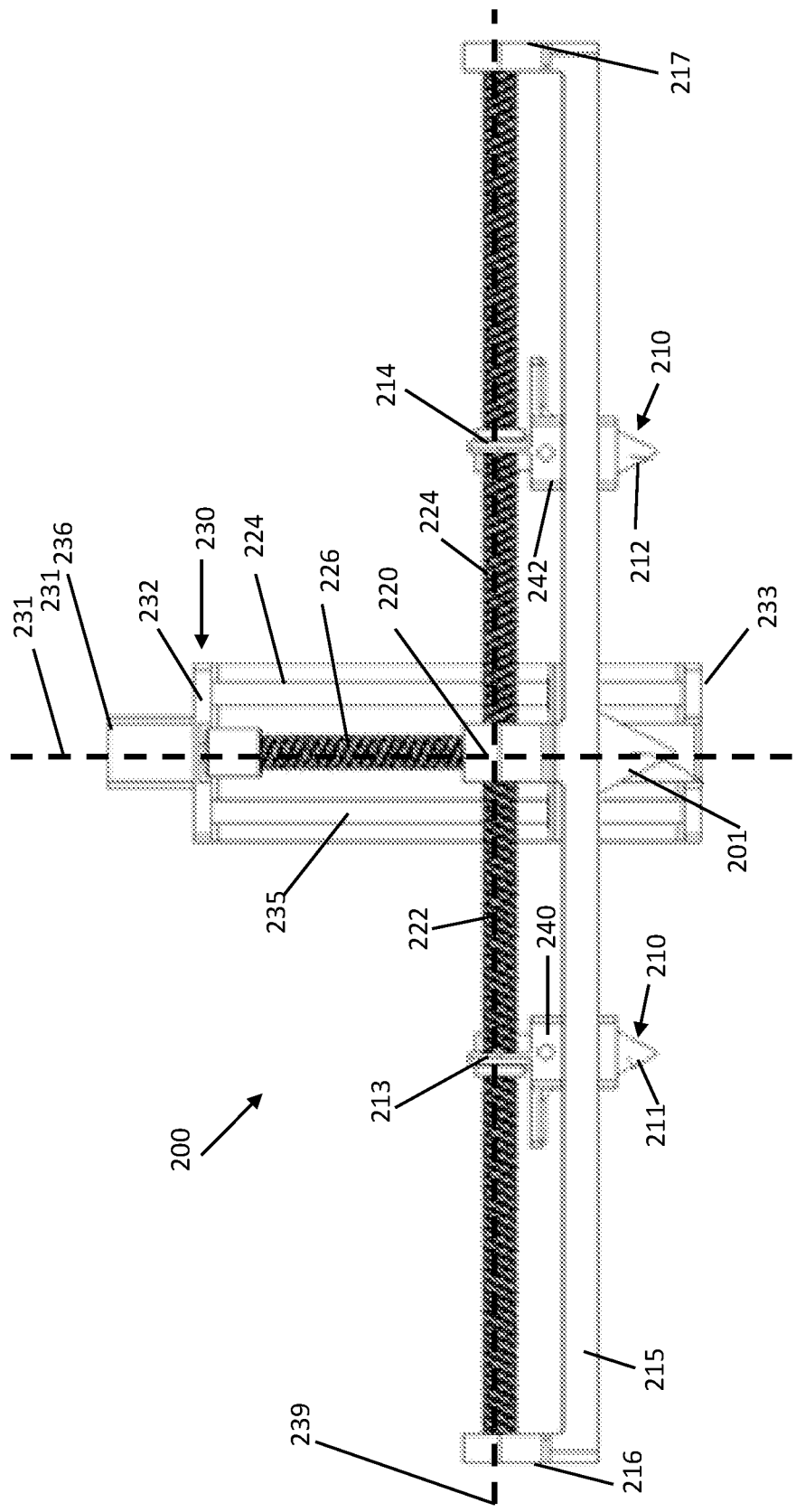
FIG. 6; depicts a link extrusion system, in accordance with one or more embodiments set forth herein.

With reference to FIG. 6, an alternate embodiment of an additive manufacturing extrusion apparatus or carriage extrusion system 200 with a plurality of extruders 210 is depicted. A central extruder 201 is positioned on a frame 215, such that the central extruder is approximately centered between a first end 216 and a second end 217 of the frame 215. The central extruder 201 extends through the frame 215 from a support 220 to a nozzle end extending away from the frame 215. Extending from the support 220 and in the opposite direction of the nozzle of the extruder 201, is an upper rail 226 extending from the support 220 to a tool support 236. Extending between the first end 216 of the frame 215 and the tool support 236 is a first rail 222. Extending between the second end 217 of the frame 215 and the tool support 236 is a second rail 224. The first rail 222 and the second rail 224 extend from tool support 236 in opposite directions, with axis 239 passing longitudinally through first rail 222 and the second rail 224. The upper rail 226 is approximately perpendicular to the first rail 222 and the second rail 224. Connected to the first rail 222 by a first carriage support 213 is a first extruder 240, having an extrusion nozzle 211. Connected to the second rail 224 by a second carriage support 214 is a second extruder 242, having a nozzle 212. The first extruder 240 may, for example, be moved along the length of the first rail 222 by first carriage support 213 being moved along the first rail 222. The second extruder 242 may, for example, be moved along the length of the second rail 224 by second carriage support 214 being moved along the second rail 224. The combination of the first rail 222, the first carriage support 213, and the first extruder 240, form a first carriage extruder. The second rail 224, the second carriage support 214, and the second extruder 242, form a second carriage extruder. The first carriage extruder and the second carriage extruder within frame 215 are depicted as being in an inline configuration. The tool support 236 may pass through an upper support member 232, the upper support member 232 being connected to a lower support member 233 by a first post 234 and a second post 235. The first post 234 and the second post 235 pass through the frame 215. The upper support member 232, the lower support member 233, the first post 234, and the second post 235 form a central support 230. An axis 231 is depicted as passing longitudinally through the central extruder 201, longitudinally through the upper rail 226, and longitudinally through the tool support 236, such that the extrusion apparatus may, for example, be rotatable about the central axis 231. Axis 239 and central axis 231 may be approximately perpendicular to each other. The frame 215 may, for example, move along first post 234 and second post 235 towards the upper support member 232 or towards the lower support member 233. Extrusion apparatus 200 may, for example, be mounted by tool support 236 on a robotic movement system with at least 1 degree of freedom, such as a robot arm (e.g., a fixed base mounted robot arm) or an articulated gantry (e.g., a track mounted robot arm). However, a robotic movement system with two or more degrees of freedom provides for a greater positioning ability of the carriage extrusion system 200. It is preferred that a robotic movement system with three or more degrees of freedom be used with extrusion apparatus 200.

Extrusion apparatus 200 may, for example, create unit cells forming a final pyramidal structure. A pyramidal join may be formed by the first extruder 240 and the second extruder 242 initially positioned away from the central axis 231. The first extruder 240 and the second extruder 242 provide extrudate and as they move towards each other, while the frame 215 is raised along first post 234 and second post 235 towards the upper support member 232, forming two members of a unit cell (e.g., two of member 301 of unit cell 300 of FIG. 3). The central extruder 201 may be used, for example, for printing in tighter spaces or where the first extruder 240 and second extruder 242 proximity may result in a collision issue, either with each other or with the extruded member of the lattice cell. In such circumstances, extrudate may be deposited from the central extruder 201 to form the joint between the two extruded members of a unit cell. The frame 215 may, for example, rotate about the central axis 231. The frame 215 may, for example, move along first post 234 and post 235, moving the central extruder along central axis 231, to position the first extruder 240 and the second extruder 242 to create the third and fourth members of the cell unit. The first extruder 240 and the second extruder 242 may, for example, move in opposite directions along the first rail 222 and the second rail 224. When positioned, the first extruder 240 and the second extruder 242 may provide extrudate and move towards each other to form the third member and the fourth member of the unit cell. The third and fourth members of the unit cell may be completed by the first extruder 240 and the second extruder 242. However, if there is insufficient space or if there may be a collision between the first extruder 240 and the second extruder 242 or with the lattice cell members, the central extruder 201 may, for example, provide extrudate to complete the third and fourth members and to connect the third and fourth members to the first and second members. The central extruder 201 may also, for example, be used to deposit a skin on the lattice truss structure or to lay additional material to strengthen a joint.

The first extruder 240 may have, for example at least one cooling nozzle (not shown). The second extruder 242 may have, for example, at least one cooling nozzle (not shown).

Figure 7:
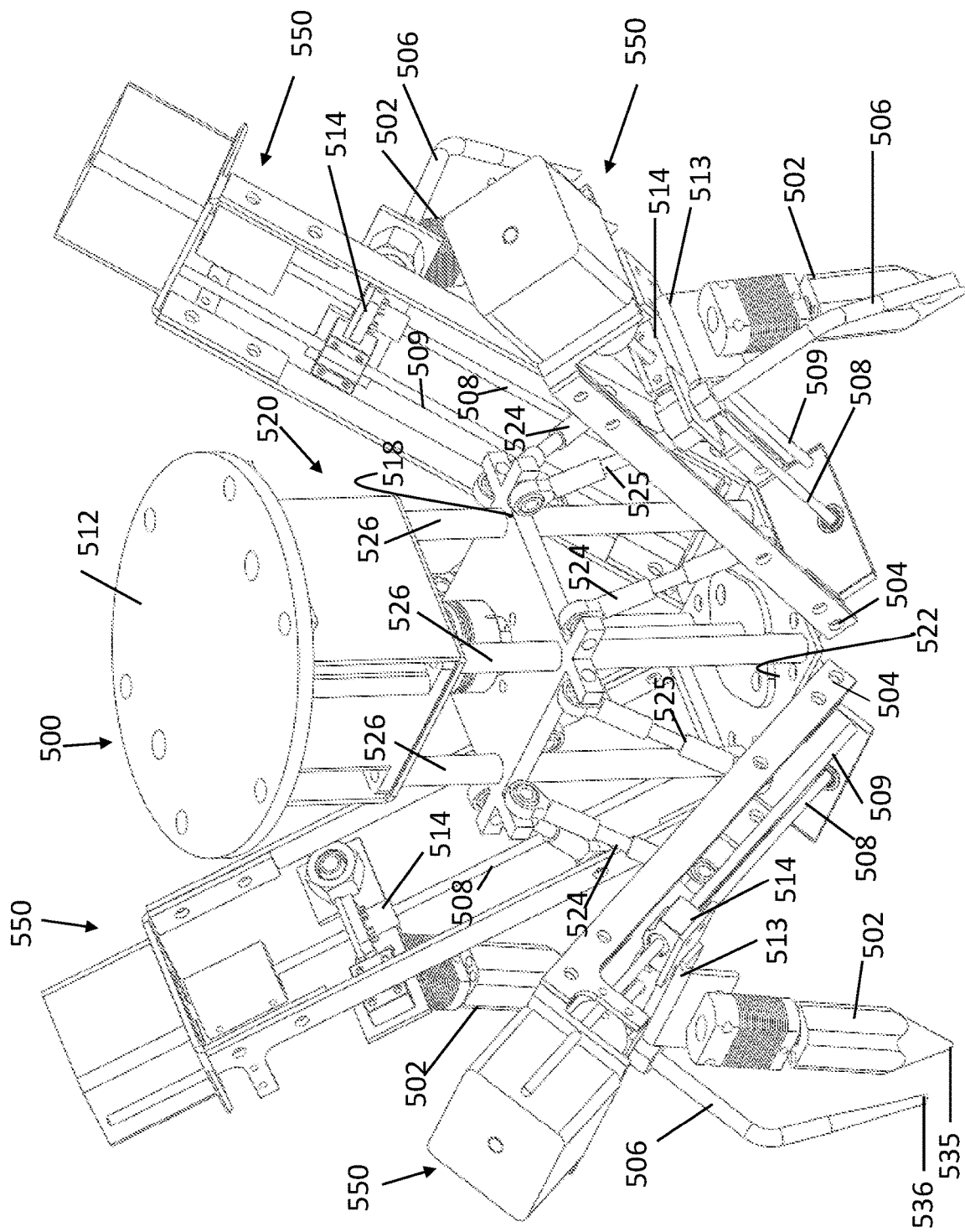
FIG. 7, depicts a link extrusion system with four extrusion arms, in accordance with one or more embodiments set forth herein.

With reference to FIG. 7, an alternate embodiment of an additive manufacturing extrusion apparatus or carriage extrusion system 500 is depicted. A central support 520 formed by a tool support 512 opposite a base 522 and connected by four posts extending therebetween. The tool support 512 and the base 522 are substantially square with the four posts substantially at the corners. The central support 520 has a lifting platform 518 movable along the four posts, between the base 522 and the tool support 512.

The tool support 512 may for example, mounted on a robotic movement system with at least 1 degree of freedom, such as a robot arm (e.g., a fixed base mounted robot arm) or an articulated gantry (e.g., a track mounted robot arm). However, a robotic movement system with two or more degrees of freedom provides for a greater positioning ability of the carriage extrusion system 500. It is preferred that a robotic movement system with three or more degrees of freedom be used with carriage extrusion system 500.

Figure 8:
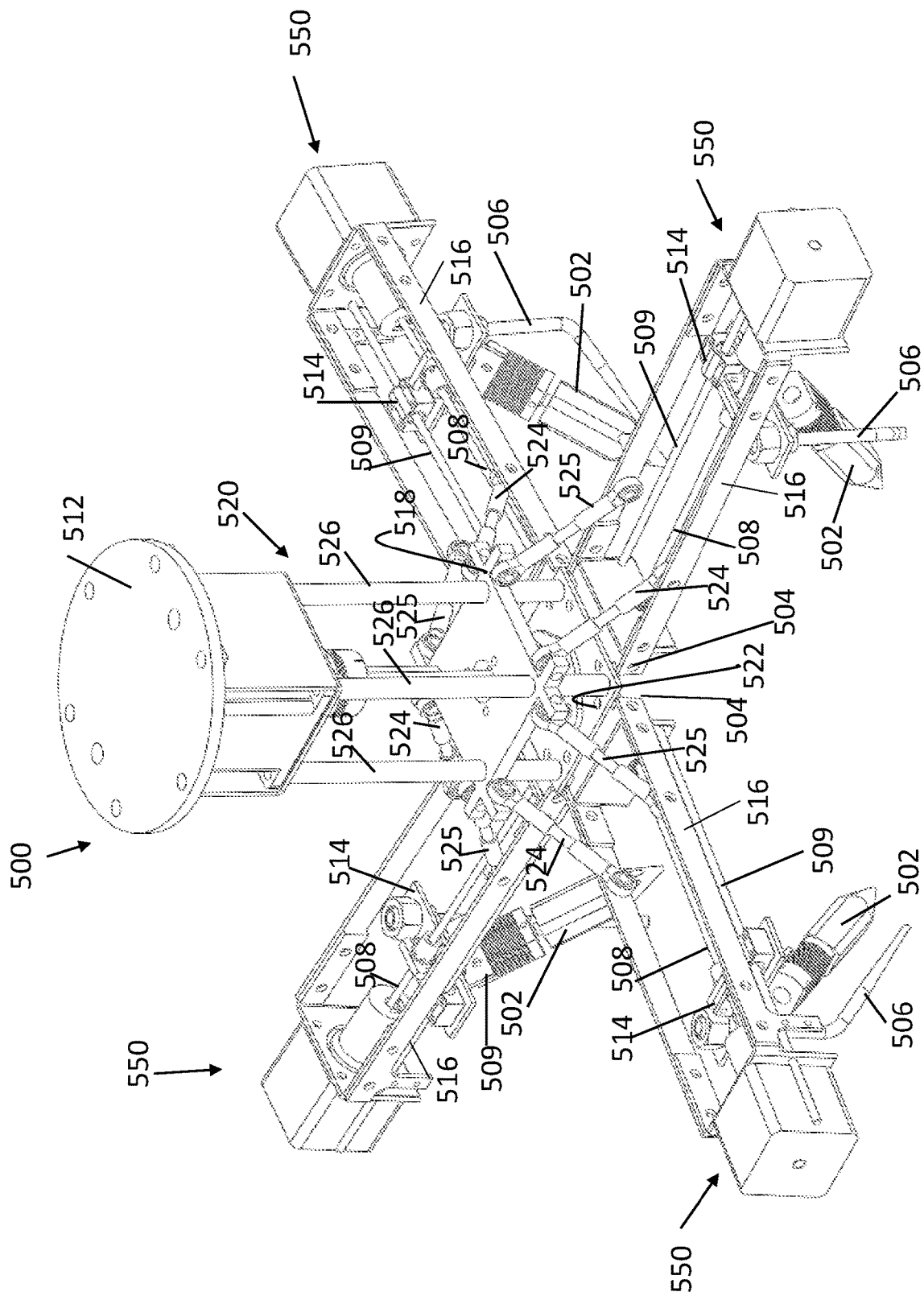
FIG. 8 depicts the link extrusion system of FIG. 7 with extrusion arms extended, in accordance with one or more embodiments set forth herein.
Figure 9:
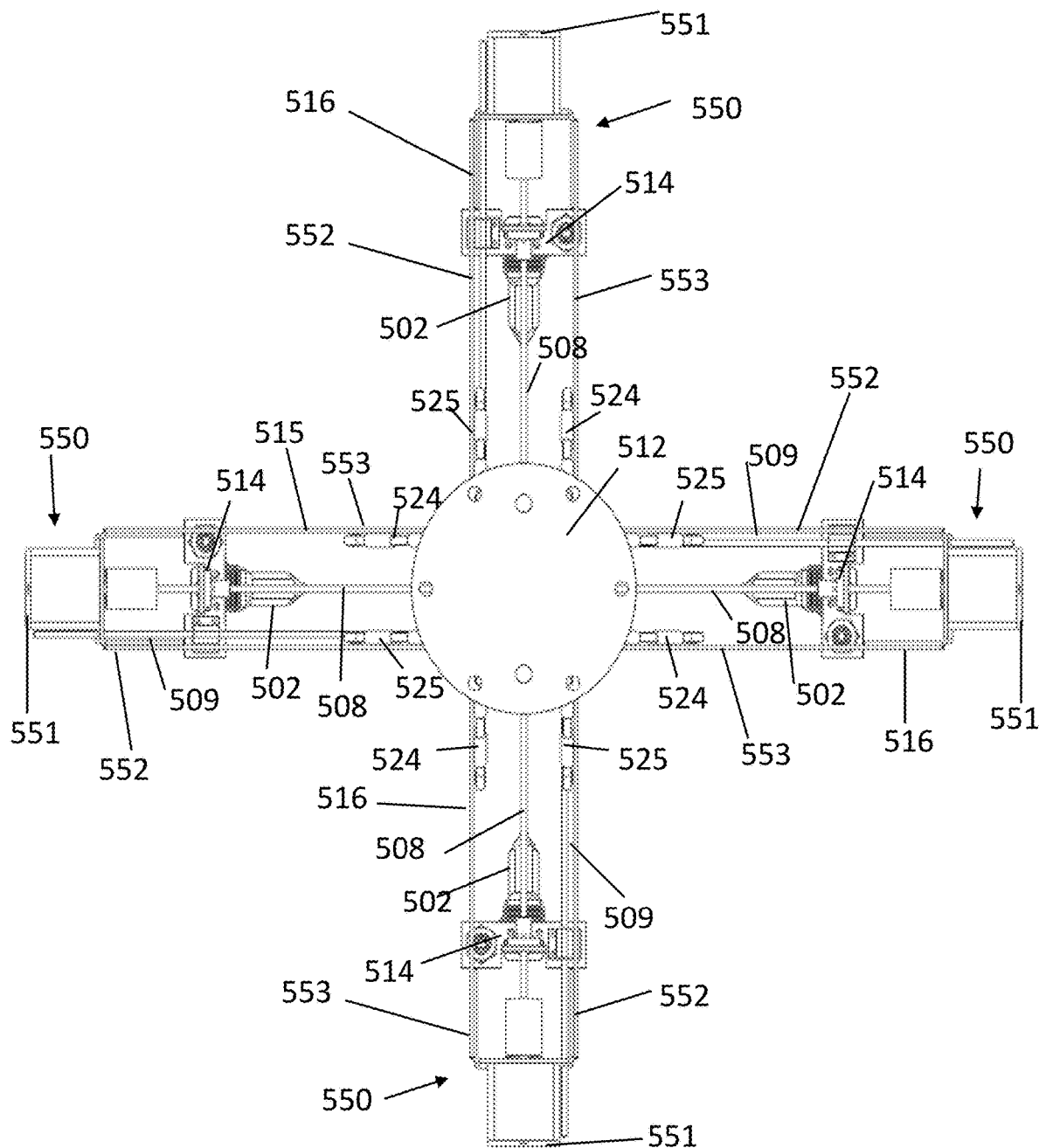
FIG. 9 depicts a top view of the link extrusion system of FIG. 7 with extrusion arms extended, in accordance with one or more embodiments set forth herein.
Figure 10:
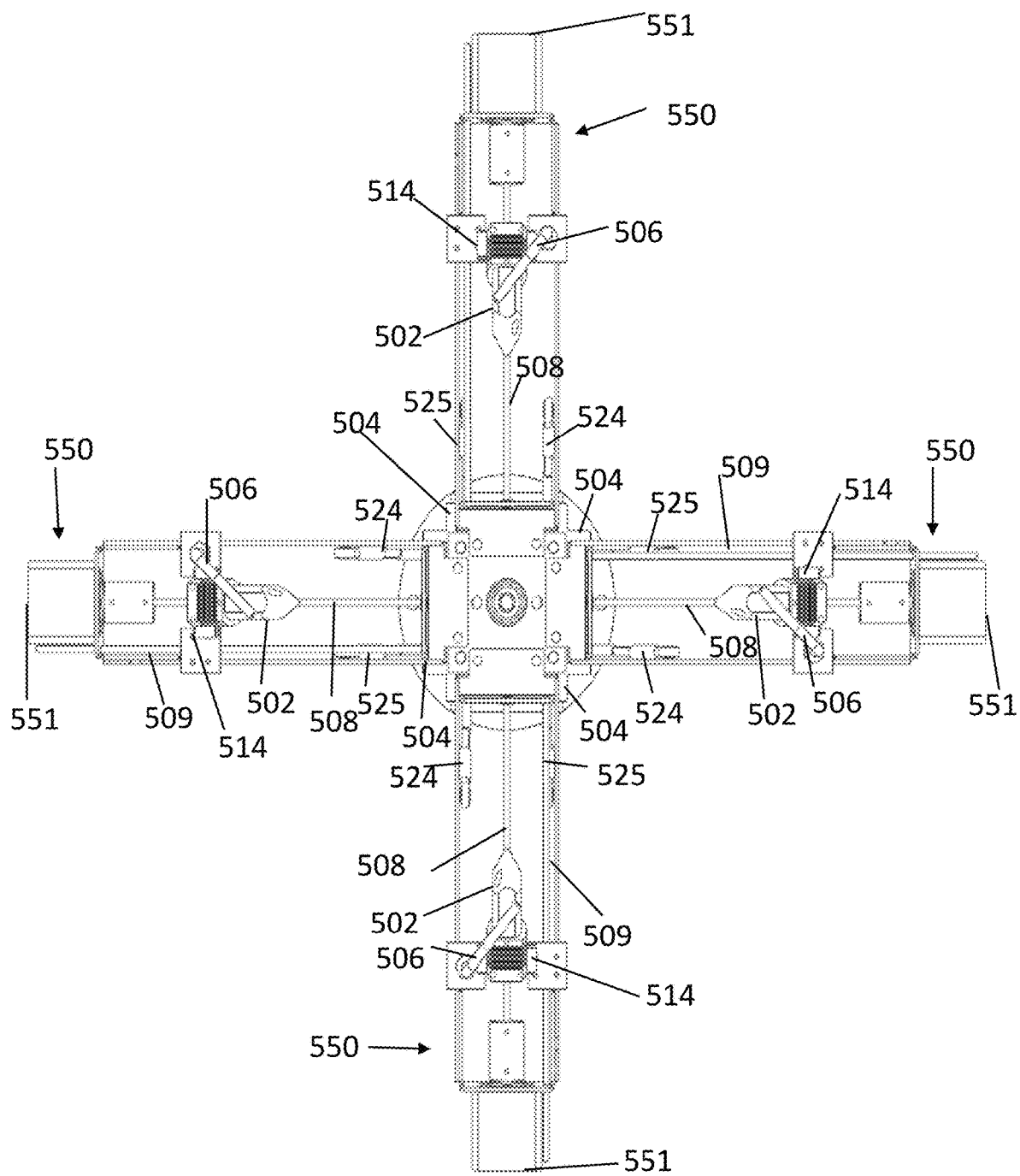
FIG. 10 depicts a bottom view of the link extrusion system of FIG. 7 with extrusion arms extended, in accordance with one or more embodiments set forth herein.

With reference to FIG. 8, the carriage extrusion system 500 of FIG. 7 is shown with the four cantilevered carriage arms 550 in a lowered position. With reference to FIG. 9, a top view of the carriage extrusion system 500 is depicted. The four carriage arms 550 are shown in a lowered position. With reference to FIG. 10, a bottom view of the carriage extrusion system 500 is depicted, with the four carriage arms 550 in a lowered position.

Connected to the base 522 on each side of the central support 520 are four cantilevered carriage arms 550. Each of the four carriage arms 550 has a frame 516, with a cantilevered end 504 connected to the base 522 and an opposite free end 551 with a first member 552 opposite a second member 553 between the free end 551 and the cantilevered end 504. Two support members are shown but there may be a single support member or more than two support members between the base 522 and the opposite free end 551. A rail 508 extends between the cantilevered end 504 and the free end 551 between the members on opposite sides of the frame. A second rail 509 extends between the cantilevered end 504 and the free end 551 between the members on opposite sides of the frame. An extruder 502, connected to a carriage 514, extends from the carriage towards a nozzle end 535, with the extruder 502 depicted as extending below the carriage 514. The extruder 502 may be, rotatably connected to the carriage 514 or the extruder 502 may extend from carriage 514 at a fixed angle. The carriage is movable along the rail 508 and second rail 509. The second rail 509 may be included to prevent carriage 514 from rotating about rail 508 and provide stability for the extruder 502 as carriage 514 moves along rail 508. A cooling nozzle 506, adjacent to the extruder, extends from the carriage towards a cooling nozzle opening 536 with the cooling nozzle opening 536 being near the extruder nozzle end 535. The cooling nozzle opening 536 may be, for example, positioned sufficiently near so that fluid emitted from the cooling nozzle opening 536 cools the extrudate emerging from the extruder nozzle opening 535 to a desired temperature.

With reference to FIGS. 7 and 8, a single cooling nozzle 506 is shown for the extruder 502 of each of the four carriage arms 550. In other embodiments, more than one cooling nozzle may be present. Thus, there may be a plurality of cooling nozzles 506 for the extruder 502 for each of the four carriage arms 550.

The four cantilevered carriage arms 550 are shown in a raised position in FIG. 7, with the free end 551 rotating about the cantilevered end 504 connected to base 522.

The arms are depicted as being approximately perpendicular to the central support 520, with the four arms 550 forming a cross shape. Each of the four arms 550 is connected to the lifting platform 518 by actuator arms 510, with each of the four arms 550 having a pair of actuator arms 510. The pair of actuator arms is shown as a first actuator arm 525 and a second actuator arm 524. A first end of each of the actuator arms 510 is rotatably connected to the lifting platform 518 and a second end of each of the actuator arms 550 is rotatably connected to the members of the frame 516 between the cantilevered end 504 and the free end 551. The first actuator arm 525 at a first end may be connected to the first member 552 and at a second end the first actuator arm 525 may be rotatably connected to lifting platform 518. The second actuator arm 524 at a first end may be connected to the second member 553 and at a second end the second actuator arm 524 may be rotatably connected to lifting platform 518. Thus, the actuator arms 510, the portion of the frame 516 between the cantilevered end 504 and the second end of the actuator arms 510, and the portion of the support posts between the base 522 and the lifting platform 518 form a triangular shape when each of the four carriage arms 550 is in the lowered position. As the lifting platform 518 is raised, the actuator arms 510 are raised and the angle between the first end and the second end is decreased. The second end of the actuator arms 510, rotatably connected to the frame 516, pulls the carriage arms 550 towards the lifting platform 518. Since the carriage arms 550 are rotatably connected to the base at the cantilevered end 504, the carriage arms 550 rotate about the cantilevered end 504. Thus, the carriage arms move from a lowered position as depicted in FIG. 8 to a raised position, as depicted in FIG. 7.

With reference to FIGS. 7-10, the carriage 514 may move, for example, along rail 508, between the free end 551 and the cantilevered end 504 of each of the four carriage arms 550. Since the extruder 502 is connected to the carriage 514, the extruder 502 moves with the carriage 514 along the rail 508. Since the extruder 502 is rotatably connected to the carriage 514, the extruder 502 may, for example, also rotate about a portion of the carriage 514.

In another embodiment, the carriage extrusion system 500 of FIG. 8 may have, for example, arms in fixed positions rather than cantilevered arms. In yet other embodiments, the carriage extrusions system may have a central extruder (e.g., a central extruder such as the central extruder 201 of FIG. 6). The central extruder may be, for example, positioned on the central support 520 with a nozzle end extending through the base 522 and a heat sink end extending towards the tool support. The central extruder may be present with embodiments that have fixed arms or cantilevered arms.

The carriage extrusion system 500 may be, for example, used to make the pyramidal unit cell 300 of FIG. 4A. With reference to FIGS. 7 10, each extruder 502 may begin at a rail position towards the free end 551 and away from the central support 520. The carriage 514 may be moved along the rail 508 toward the central support 520 as each extruder 502 provides the extrudate. The carriage extrusion system may be, for example, raised along an approximately vertical path by the tool support 512 by the robotic movement system during extrusion. The carriage arms 550 may be, for example, positioned approximately perpendicular to the central support 520. The member (e.g., member 301) is formed from the extrudate from each extruder 502 through continuous extrusion, with the four extruder nozzle openings 535 meeting at the top of the pyramidal cell to form the joint between the four members. If a central extruder is present in the embodiment, extrudate may be deposited from the central extruder to form a joint between the extruded members of a unit cell. The next cell, may, for example, be formed by creating an inverted pyramidal structure with each extruder 502 depositing extrudate while moved by the carriage along the track towards the free end 551 and the carriage extrusion system being raised or positioned by the robotic movement system.

Another embodiment of the carriage extrusion system 500 may be, for example, used to make the pyramidal unit cell 300 of FIG. 4A. With reference to FIGS. 7-10, each extruder 502 may begin at a rail position towards the free end 551 and away from the central support 520. The carriage 514 may be moved along the rail 508 toward the central support 520 as each extruder 502 provides the extrudate. Simultaneously, the carriage extrusion system 500 may be, for example, positioned by the tool support 512 by the robotic movement system and each of the four carriage arms 550 may be raised or lowered by the lifting platform 518 about the cantilevered end 504 to assist in positioning each extruder 502 during free standing member formation. The member (e.g., member 301) is formed from the extrudate from each extruder 502 through continuous extrusion, with the four extruder nozzle openings 535 meeting at the top of the pyramidal cell to form the joint between the four members. After the pyramidal cell is formed, the carriage extrusion system may be, for example, positioned by the robotic movement system to begin an adjacent cell. The adjacent cell, may, for example, be formed by creating an inverted pyramidal structure, with each extruder 502 depositing extrudate while moved by the carriage along the track towards the free end 551, the cantilevered arms being lowered or raised, and the carriage extrusion system being raised or positioned by the robotic movement system.

The carriage extrusion system 500 may, for example, continue to form unit cells until a final structure is formed.

An embodiment of the carriage extrusion system 500 may have a central frame extending from a lower end to an upper end; a central extruder having a heat sink connected to a heat block connected to an extruder nozzle, the extruder nozzle extending through and away from the lower end, and the extruder further having a filament passage extending from an opening in the heat sink through the heat block and to an opening in the extruder nozzle; a plurality of arm frames extending out from the central frame between a frame end and a free end; each of the plurality of arm frames may have a rail extending between the frame end and the free end, the rail having a carriage movably connected, and the carriage may be movable along the rail between the frame end and the free end; an extruder connected to the carriage and extending below an arm frame, the extruder having a heat sink connected to a heat block connected to an extruder nozzle and the extruder further having a filament passage extending from an opening in the heat sink through the heat block and to an opening in the extruder nozzle; at least one cooling nozzle adjacent to the extruder and the at least one cooling nozzle having a cooling nozzle opening 536 adjacent to the extruder nozzle, the at least one cooling nozzle providing cooling fluid during extruder operation; at least one central cooling nozzle adjacent to the central extruder and the at least one central cooling nozzle having a cooling nozzle opening 536 adjacent to the central extruder nozzle, the at least one central cooling nozzle providing cooling fluid during extruder operation; wherein during apparatus operation, the extruder is moved by the carriage along the rail and extrudate is provided by the extruder from the extruder nozzle in a continuous stream from a starting point to an end point forming a free standing member therebetween; wherein the at least one cooling nozzle provides extrudate cooling as the extrudate emerges from the opening 535 in the extruder nozzle 502 and at least once central cooling nozzle provide extrudate cooling as the extrudate emerges from the extruder nozzle of the central extruder; and where a combination of members extruded form a freestanding unit cell.

The central extruder may provide extrudate to assist the extruders on the plurality of arm frames to form a free standing unit cell.

An embodiment of the carriage extrusion system 500 may have a central frame extending from a lower end to an upper end; a plurality of arm frames extending out from the central frame between a frame end and a free end; each of the plurality of arm frames having a rail extending between the frame end and the free end, the rail having a carriage movably connected, and the carriage movable along the rail between the frame end and the free end; an extruder connected to the carriage and extending below an arm frame, the extruder having a heat sink connected to a heat block connected to an extruder nozzle and the extruder further having a filament passage extending from an opening in the heat sink through the heat block and to an opening in the extruder nozzle; at least one cooling nozzle adjacent to the extruder and the at least one cooling nozzle having a cooling nozzle opening adjacent to the extruder nozzle, the at least one cooling nozzle providing cooling fluid during extruder operation; wherein during apparatus operation, the extruder is moved by the carriage along the rail and extrudate is provided by the extruder from the extruder nozzle in a continuous stream from a starting point to an end point forming a free standing member therebetween; wherein the at least one cooling nozzle provides extrudate cooling as the extrudate emerges from the opening in the extruder nozzle; and where a combination of members extruded from the extruder on each of the plurality of arm frames form a freestanding unit cell in a lattice structure.

Each of the plurality of the arm frames at the frame end has a movable cantilevered connection to the bottom end of the central frame and during operation of the extruder connected to each of the plurality of arm frames, the arm frame rotates about the cantilevered connection.

The carriage further may further have a joint connected to the extruder, the extruder being pivotable at the joint.

An embodiment of the carriage extrusion system 500 may have a central frame extending from a lower end to an upper end; a central extruder having an extruder nozzle, the extruder nozzle extending through and away from the lower end; a plurality of arm frames extending out from the central frame between a frame end and a free end; each of the plurality of arm frames having a rail extending between the frame end and the free end, the rail having a carriage movably connected, and the carriage movable along the rail between the frame end and the free end; an extruder connected to the carriage and extending from and below the each of the plurality arms, the extruder having an extruder nozzle; at least one cooling nozzle adjacent to the extruder, the at least one cooling nozzle providing cooling fluid during extruder operation; at least one central cooling nozzle adjacent to the central extruder, the at least one central cooling nozzle providing cooling fluid during extruder operation; wherein during apparatus operation, the extruder is moved by the carriage along the rail and extrudate is provided by the extruder from the extruder nozzle in a continuous stream from a starting point to an end point forming a free standing member therebetween; and where the at least one cooling nozzle and the at least one central cooling nozzle provides extrudate cooling.

An embodiment of the carriage extrusion system 500 may have a central frame extending from a lower end to an upper end; a plurality of arm frames extending out from the central frame between a frame end and a free end; each of the plurality of arm frames having a rail extending between the frame end and the free end, the rail having a carriage movably connected, and the carriage movable along the rail between the frame end and the free end; an extruder connected to the carriage and extending below each of the plurality of arms, the extruder having an extruder nozzle; at least one cooling nozzle adjacent to the extruder, the at least one cooling nozzle providing cooling fluid during extruder operation; wherein during apparatus operation, the extruder is moved by the carriage along the rail and extrudate is provided by the extruder from the extruder nozzle in a continuous stream from a starting point to an end point forming a free standing member therebetween; where the at least one cooling nozzle provides extrudate cooling.

Other embodiments of the carriage extrusion system 200 and 500 may have more carriage extruders and the carriage extruders need not be configured inline (e.g., carriage extrusion system 200) or in a cross configuration (e.g., carriage extrusion system 500) may be positioned relative to each other in difference configurations.

As with the claw extruder system 100, described above, the unit cell created by the carriage extrusion system 200 or the carriage extrusion system 500 is a pyramidal or inverted pyramidal unit cell (e.g., cell unit 300) with uniform cells. However, the unit cellular structure need not be pyramidal and may be configured (e.g., shaped and dimensioned) to form any three-dimensional truss structure. The trusses may, for example, be similarly or dissimilarly shaped and dimensioned within a single unit cell. Furthermore, a final structure may be composed of a plurality of uniform or non-uniform unit cells.

With the claw extruder system 100, the carriage extrusion system 200, and the carriage extrusion system 500, the speed of extrusion is increased because the extrusion is continuous rather than in laminated layers. Unit cell formation speed is increased because a plurality of extruders providing continuous extrusion builds each unit cell. The use of a single continuous extrusion to form each member and the joints between members provides for a stronger connection due to the fused filament fabrication extrusion and fluid to fluid connections between members, rather than fluid to solid material connections found in lamination layering. Depending on the lattice structure being built, the rate of extrudate expulsion may also be controlled to control the speed of extrusion and the speed of construction. While FFF is referred to throughout this application, those skilled in the art will understand that other forms of additive manufacturing, such as FGF, may also be used in other embodiments and other forms of extrudate and filament materials and combinations of materials may be used with these other embodiments Collision avoidance between arms, extruders, and lattice elements, may be determined during the tool path planning. Construction instructions may be, for example, provided to the extruder system 100, the carriage extrusion system 200, and the carriage extrusion system 500 prior to commencing fabrication. In other embodiments, sensors may be, for example, placed on each of the claw extruder system 100, the carriage extrusion system 200, and the carriage extrusion system 500. Thus, an arm may be stopped from a collision when an object is determined to be in the path of the projected arm movement map.

In other embodiments, one or more of the articulated arm extruders 110 may be replaced with a subtractive apparatus such as, for example, a drill, a milling apparatus, a fiber laying roller, curing lamps, and/or an acidic slurry dispenser.

It should be noted that extruder system 100, the carriage extrusion system 200, and the carriage extrusion system 500 have been described for fused filament fabrication and use with filaments, the systems, apparatus, and methods described herein may use granulates for fused granulate fabrication.

In one aspect of the present disclosure provided herein, is an apparatus for additive manufacturing, having a body; a plurality of articulated arms, each having a jointed connection to the body and a free end, the plurality of articulated arms movable relative to each other and the plurality of articulated arms having opposable motions; an extruder at the free end of each of the plurality of articulated arms, the extruder having a heat sink connected to a heat block having an extruder nozzle and the extruder further having a filament passage extending from an opening in the heat sink through the heat block and to an opening in the extruder nozzle; at least one cooling nozzle extending from the free end of each of the plurality of articulated arms and the at least one cooling nozzle having a cooling nozzle opening adjacent to the extruder nozzle, the at least one cooling nozzle providing cooling fluid during extruder operation; where during apparatus operation the plurality of arms are moved and extrudate is provided by the extruder from the extruder nozzle in a continuous stream from a starting point to an end point and forming a free standing member therebetween; where the at least one cooling nozzle provides extrudate cooling at the opening in the extruder nozzle; and where a combination of extruded members from the extruder on each of the plurality of articulated arms form a free standing unit cell.

In another aspect of the present disclosure provided herein, is an apparatus for additive manufacturing, having a central frame extending from a lower end to an upper end; a central extruder having a heat sink connected to a heat block connected to an extruder nozzle, the extruder nozzle extending through and away from the lower end, and the extruder further having a filament passage extending from an opening in the heat sink through the heat block and to an opening in the extruder nozzle; a plurality of arm frames extending out from the central frame between a frame end and a free end; each of the plurality of arm frames having a rail extending between the frame end and the free end, the rail having a carriage movably connected, and the carriage movable along the rail between the frame end and the free end; an extruder connected to the carriage and extending below an arm frame, the extruder having a heat sink connected to a heat block connected to an extruder nozzle and the extruder further having a filament passage extending from an opening in the heat sink through the heat block and to an opening in the extruder nozzle; at least one cooling nozzle adjacent to the extruder and the at least one cooling nozzle having a cooling nozzle opening adjacent to the extruder nozzle, the at least one cooling nozzle providing cooling fluid during extruder operation; at least one central cooling nozzle adjacent to the central extruder and the at least one central cooling nozzle having a cooling nozzle opening adjacent to the central extruder nozzle, the at least one central cooling nozzle providing cooling fluid during extruder operation; where during apparatus operation, the extruder is moved by the carriage along the rail and extrudate is provided by the extruder from the extruder nozzle in a continuous stream from a starting point to an end point forming a free standing member therebetween; where the at least one cooling nozzle provides extrudate cooling as the extrudate emerges from the opening in the extruder nozzle; and where a combination of members extruded from the extruder on each of the plurality of arm frames form a freestanding unit cell.

In another aspect of the present disclosure provided herein, is an apparatus for additive manufacturing, having a central frame extending from a lower end to an upper end; a plurality of arm frames extending out from the central frame between a frame end and a free end; each of the plurality of arm frames having a rail extending between the frame end and the free end, the rail having a carriage movably connected, and the carriage movable along the rail between the frame end and the free end; an extruder connected to the carriage and extending below an arm frame, the extruder having a heat sink connected to a heat block connected to an extruder nozzle and the extruder further having a filament passage extending from an opening in the heat sink through the heat block and to an opening in the extruder nozzle; at least one cooling nozzle adjacent to the extruder and the at least one cooling nozzle having a cooling nozzle opening adjacent to the extruder nozzle, the at least one cooling nozzle providing cooling fluid during extruder operation; where during apparatus operation, the extruder is moved by the carriage along the rail and extrudate is provided by the extruder from the extruder nozzle in a continuous stream from a starting point to an end point forming a free standing member therebetween; where the at least one cooling nozzle provides extrudate cooling as the extrudate emerges from the opening in the extruder nozzle; and where a combination of members extruded from the extruder on each of the plurality of arm frames form a freestanding unit cell in a lattice structure.

In another aspect of the present disclosure provided herein, is a method for additive manufacturing of a structure with a lattice infill, including instructing the additive manufacturing system by programming cell positions and completed object structure information; positioning extrusion system at a starting position; beginning forming, by each extruder arm, members of a unit cell; completing forming, by each extruder arm, members of the unit cell; forming, by one or more extruder arms, a joint connecting members of the unit cell; moving the additive manufacturing system to a next cell position; and repeating the above steps until a completed structure is formed.

In another aspect of the present disclosure provided herein, is an apparatus for additive manufacturing, having a body; a plurality of articulated arms, each having a jointed connection to the body and a free end, the plurality of articulated arms movable relative to each other and having opposable motions; an extruder at the free end of each of the plurality of articulated arms, the extruder having an extruder nozzle; at least one cooling nozzle extending from the free end of each of the plurality of articulated arms, the at least one cooling nozzle providing cooling fluid during extruder operation; where during apparatus operation the plurality of arms are moved and extrudate is provided from the extruder nozzle in a continuous stream from a starting point to an end point and forming a free standing member therebetween; and where the at least one cooling nozzle provides extrudate cooling at the opening in the extruder nozzle.

In another aspect of the present disclosure provided herein, is an apparatus for additive manufacturing, a central frame extending from a lower end to an upper end; a central extruder having an extruder nozzle, the extruder nozzle extending through and away from the lower end; a plurality of arm frames extending out from the central frame between a frame end and a free end; each of the plurality of arm frames having a rail extending between the frame end and the free end, the rail having a carriage movably connected, and the carriage movable along the rail between the frame end and the free end; an extruder connected to the carriage and extending from and below the each of the plurality arms, the extruder having an extruder nozzle; at least one cooling nozzle adjacent to the extruder, the at least one cooling nozzle providing cooling fluid during extruder operation; at least one central cooling nozzle adjacent to the central extruder, the at least one central cooling nozzle providing cooling fluid during extruder operation; where during apparatus operation, the extruder is moved by the carriage along the rail and extrudate is provided by the extruder from the extruder nozzle in a continuous stream from a starting point to an end point forming a free standing member therebetween; and where the at least one cooling nozzle provides extrudate cooling.

In another aspect of the present disclosure provided herein, is an apparatus for additive manufacturing, a central frame extending from a lower end to an upper end; a plurality of arm frames extending out from the central frame between a frame end and a free end; each of the plurality of arm frames having a rail extending between the frame end and the free end, the rail having a carriage movably connected, and the carriage movable along the rail between the frame end and the free end; an extruder connected to the carriage and extending below each of the plurality of arms, the extruder having an extruder nozzle; at least one cooling nozzle adjacent to the extruder, the at least one cooling nozzle providing cooling fluid during extruder operation; where during apparatus operation, the extruder is moved by the carriage along the rail and extrudate is provided by the extruder from the extruder nozzle in a continuous stream from a starting point to an end point forming a free standing member therebetween; where the at least one cooling nozzle provides extrudate cooling.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

What is claimed is:

1. An extrusion apparatus for additive manufacturing, comprising:
    a body having a first side opposite a second side, the second side configured for orientation towards an additive manufacturing object during extrusion apparatus operation;
    a mounting member connected to the first side, the mounting member configured for connection to a robot movement system and connected to the robot movement system during extrusion apparatus operation;
    a plurality of articulated arm extruders, each having a joint directly coupled to the body at one end of the articulated arm extruder, extending from the body and from the second side to a free end, the plurality of articulated arm extruders movable in a coordinated manner relative to each other and having opposable motions about the joint, and the plurality of articulated arm extruders oriented towards the additive manufacturing object during extrusion apparatus operation;
    an extruder nozzle at the free end of each of the plurality of articulated arm extruders; and
    at least one cooling nozzle extending from the free end of each of the plurality of articulated arm extruders;
    wherein the extrusion apparatus is an end effector; and
    wherein during operation, the extrusion apparatus is positioned and moved by the robot movement system in three-dimensional space.

2. The extrusion apparatus of claim 1, wherein during apparatus operation, each of the plurality of articulated arm extruders move and extrudate is provided by the extruder nozzle in a continuous stream from a starting point to an end point and forming a free standing member therebetween.

3. The extrusion apparatus of claim 2 wherein during operation the extrusion apparatus is moved and positioned by the robot movement system to form a plurality of unit cells each comprising a plurality of the free standing members, and the plurality of unit cells forming a lattice structure.

4. The extrusion apparatus of claim 1 further comprising:
    at least one cooling nozzle extending from the free end of each of the plurality of articulated arm extruders and the at least one cooling nozzle having a cooling nozzle opening adjacent to the extruder nozzle.

5. The extrusion apparatus of claim 4, wherein the at least one cooling nozzle provides cooling fluid during operation of the plurality of articulated arm extruders.

6. The extrusion apparatus of claim 4, wherein the cooling nozzle opening is adjacent to an extruder nozzle opening.

7. The extrusion apparatus of claim 1, wherein each of the plurality of articulated arm extruders has a heat sink between the joint and the free end connected to a first end of a heat block and the extruder nozzle connected at a second end of the heat block, the extruder nozzle extending from the heat block towards a nozzle opening, and each of the plurality of articulated arm extruders further having a filament passage extending from an opening in the heat sink through the heat block and to the nozzle opening.

8. The extrusion apparatus of claim 7, wherein each of the plurality of articulated arm extruders has a second joint between the joint and the free end, the free end movable about the second joint.

9. The extrusion apparatus of claim 8, wherein the plurality of articulated arm extruders are grouped in pairs having opposable motion.

10. The extrusion apparatus of claim 9, having two pairs of articulated arm extruders.

11. The extrusion apparatus of claim 10, wherein each of the two pairs of articulated arm extruders have a range of opposing motion from a position where the extruder nozzles are in line but facing opposite directions to a position where the extruder nozzles are adjacent to each other.

12. The extrusion apparatus of claim 8 further comprises:
an actuator connected to each of the plurality of articulated arm extruders between the joint and the second joint, the actuator configured to move each of the plurality of articulated arm extruders about the joint and rotatably move the free end about the second joint.

13. The extrusion apparatus of claim 12 wherein each of the plurality of arm extruders is independently controlled.

14. The extrusion apparatus of claim 13 wherein motion about the joint and motion of the free end about the second joint of each of the plurality of arm extruders is independently controlled.

15. The extrusion apparatus of claim 7, wherein filament material inserted into the filament passage is maintained at a temperature below a glass transition temperature in the heat sink and above the glass transition temperature between entry into the heat block and exit as extrudate from the extruder nozzle opening.

16. The extrusion apparatus of claim 7 wherein the heat block is at the end of the free end of each of the plurality of articulated arm extruders.

17. The extrusion apparatus of claim 1 wherein each of the plurality of articulated arm extruders is independently controlled.

18. The extrusion apparatus of claim 1, wherein each of the plurality of articulated arm extruders has at least two degrees of freedom.

19. The extrusion apparatus of claim 1 wherein the robot movement system is selected from a group consisting of a fixed base robot arm, an articulated gantry, and a track mounted robot arm.

20. The extrusion apparatus of claim 1 further comprising:
a controller comprising:
a processor, memory, and programmed software stored in the memory and providing instructions executed by the processor to control and operate each of the plurality of articulated arm extruders and to move and position the extrusion apparatus by the robot movement system.

* * * * *